United States Patent
Terai et al.

[15] 3,671,476
[45] June 20, 1972

[54] ELECTRODEPOSITION COLOR COATING COMPOSITION AND METHOD FOR ELECTRODEPOSITION COLOR COATING OF METAL THEREWITH

[72] Inventors: Shiro Terai, Nagoya; Toshio Suzuki, Kasugai; Yoshihumi Hasegawa, Nagoya; Shojiro Horiguchi, Tokyo; Michiei Nakamura, Soka; Shizuo Kimata; Tadanobu Suzuki, both of Nagoya, all of Japan

[73] Assignees: Sumitomo Light Metal Industries, Ltd.; Dainichiseika Color & Chemicals Mfg. Co., Ltd.; Toagosei Chemical Industry Co., Ltd., Tokyo, Japan

[22] Filed: Feb. 24, 1970

[21] Appl. No.: 13,763

[30] Foreign Application Priority Data

March 1, 1969 Japan..................................44/15038
Aug. 8, 1969 Japan..................................44/62303

[52] U.S. Cl.................260/23 AR, 117/132 B, 117/161 LN, 117/161 UC, 204/181, 260/21, 260/29.6 H, 260/33.2 R, 260/41 C, 260/41 R, 260/856
[51] Int. Cl..................C09d 3/74, C09d 5/24, C23b 13/00
[58] Field of Search.................260/23 AR, 29.6 H, 41 R; 8/4

[56] References Cited

UNITED STATES PATENTS

| | | | |
|---|---|---|---|
| 3,494,882 | 2/1970 | Andrews | 260/22 |
| 3,341,505 | 9/1967 | Gander | 260/86.1 |
| 3,467,642 | 9/1969 | Horiguchi et al. | 260/141 |
| 3,337,288 | 8/1967 | Horiguchi et al. | 8/4 |
| 3,344,098 | 9/1967 | Horiguchi et al | 260/22 |
| 3,112,981 | 12/1963 | Fuortes et al | 8/4 |
| 3,349,055 | 10/1967 | Taguchi | 260/29.6 |
| 3,366,563 | 1/1968 | Hart et al | 204/181 |

*Primary Examiner*—Donald E. Czaja
*Assistant Examiner*—Ronald W. Griffin
*Attorney*—Karl W. Flocks

[57] ABSTRACT

An electrodeposition-color-coating composition which comprises (A) a water-soluble vinyl copolymer containing as the essential constitutional elements of the copolymer 95 to 70 percent by weight of at least one $\alpha,\beta$-ethylenically unsaturated monomer and an ammonium or amine salt of 5 to 30 percent by weight of at least one $\alpha,\beta$-ethylenically unsaturated carboxylic acid, or a mixture of a major amount of said vinyl copolymer and a minor amount of a methylol melamine derivative compatible therewith, and (B) at least one member selected from the group consisting of (1) an ammonium or amine salt of a chromogen-bonded polymer obtained by reacting (a) a chromogen having diazonium group or $\alpha,\beta$-ethylenically unsaturated group with (b) and $\alpha,\beta$-ethylenically unsaturated carboxylic acid or a mixture of an $\alpha,\beta$-ethylenically unsaturated carboxylic acid and other $\alpha,\beta$-ethylenically unsaturated monomer, (2) an ammonium or amine salt of a chromogen-bonded polymer prepared by reacting (a') a chromogen intermediate having a diazonium group or $\alpha,\beta$-ethylenically unsaturated group, with the above-mentioned component (b) and subsequently subjecting the reaction product to development and (3) an aqueous dispersion of a pigment prepared by previously dispersing the pigment in water with a nonionic or an anionic surface active agent. Said composition can electrophoretically be coated on conductive metals, such as aluminum and an aluminum alloy in a known manner at a potential of 30 to 150 volts, followed by baking the coated metals at 120° to 230° C., whereby a light-fast, corrosion-resistant, colored and transparent coating having protective performances and beautiful appearance can be obtained.

48 Claims, No Drawings

ELECTRODEPOSITION COLOR COATING COMPOSITION AND METHOD FOR ELECTRODEPOSITION COLOR COATING OF METAL THEREWITH

This invention relates to an electrodeposition-color-coating composition and to a method of electrodeposition-color-coating a metal with said composition. More particularly, this invention relates to an electrodeposition-color-coating composition comprising a water-soluble vinyl copolymer and a water-soluble chromogenbonded polymer and/or an aqueous dispersion of pigments, and to a method for electrophoretically coating a metal with said composition to form a transparent, colored, highly light-fast coating layer on the metal.

There have heretofore been used, two kinds as the coloring matter in a color coating composition, a white or chromatic, inorganic or organic pigment insoluble in water, organic solvents, or other media, which pigment is fixed on the surface of substrates by the aid of a vehicle or a bonding agent to form a colored coating, and a chromatic, organic dyestuff soluble in water or organic solvents, which dyestuff colors the substrate with or without the aid of a bonding agent. In the case where pigments are used, the coating is excellent in light fastness and, solvent and chemical resistance, but it is deficient in transparency because the substrate is coated with a dispersion of pigment particles, and particularly it is impossible to display the original metallic lustre of the substrate. On the contrary, in the case where dyestuffs are used, the coating is transparent, but it is deficient in resistance to light, solvents, and chemicals. Thus, there has been no coloring matter which can practically be used even when the coatings are exposed to outdoor environment for a long period.

An object of this invention is to provide an electrodeposition coating composition which is capable of forming a transparent, colored coating.

Another object of the invention is to provide an electrodeposition coating composition which is capable of electrophoretically forming on a metal surface that may be exposed to outdoor conditions, a colored coating which is remarkably fast to light and is able to exhibit a metallic lustre.

A further object of the invention is to provide a method of electrodeposition-coating a metallic material with said composition.

According to the present invention there is provided an electrodeposition-color-coating composition which comprises (A) a water-soluble vinyl copolymer containing, as the essential constituents, 95 to 70 percent by weight of at least one α,β-ethylenically unsaturated monomer having the general formula,

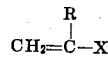

wherein R is a hydrogen atom or a lower alkyl group, X is —COOR' (R' being an alkyl or a hydroxyalkyl group), —CONH₂ or methylol- or alkoxymethyl-derivative thereof, —OCOR" (R" being a lower alkyl group), —CN, or

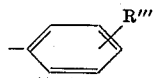

(R'" being a hydrogen atom or a lower alkyl group), and 5 to 30 percent by weight (as carboxylic acid) of an ammonium or amine salt of at least one α,β-ethylenically unsaturated carboxylic acid, or said vinyl copolymer admixed with a minor amount of a methylol melamine derivative compatible therewith, and (B) at least one member selected from the group consisting of (1) an ammonium- or amine-salt of a chromogen-bonded polymer obtained by reacting (a) a chromogen having diazonium group or α,β-ethylenically unsaturated group with (b) an α,β-ethylenically unsaturated carboxylic acid or a mixture of an α,β-ethylenically unsaturated carboxylic acid and other α,β-ethylenically unsaturated monomer, (2) an ammonium- or amine-salt of a chromogen-bonded polymer prepared by reacting (a') an chromogen intermediate having a diazonium group or α,β-ethylenically unsaturated group, with the above-mentioned component (b) and subsequently subjecting the reaction product to development, and (3) an aqueous pigment dispersion prepared by previously dispersing a pigment in water with a nonionic or anionic surface active agent.

The term "α,β-ethylenically unsaturated carboxylic acid" used herein means to include beside not only said carboxylic acids but also anhydrides and halides of said carboxylic acids.

The composition of this invention can be applied not only to aluminum and its alloys but also to other conductive metals, such as iron, galvanized iron, tin plate, nickel, chromate treated metal, copper, brass, and those conductive metals subjected to chemical conversion treatment to form a colored and transparent coating on these metal surfaces which will possibly be exposed to outdoor environment for a long time, said coating being able to exhibit a metallic lustre and having excellent fastness to light.

The film-forming component of the present composition is a soluble vinyl copolymer comprising at least one α,β-ethylenically unsaturated monomer and an ammonium or amine salt of at least one α,β-ethylenically unsaturated carboxylic acid. Said α,β-ethylenically unsaturated monomer is copolymerized with said α,β-ethylenically unsaturated carboxylic acid to form the main chain of the polymer having a film-forming ability. The α,β-ethylenically unsaturated monomer used in the present composition has the general formula,

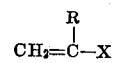

wherein R is a hydrogen atom or a lower alkyl group, preferably an alkyl group having 1 to 3 carbon atoms, and X, which will remain in the polymer as a side chain, is —COOR', —CONH₂ or a methylol- or alkoxymethyl-derivative thereof, —OCOR", —CN, or

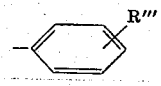

R' in —COOR' is an alkyl or a hydroxyalkyl group having preferably 1 to 8 carbon atoms. When R' is an alkyl the monomers are alkyl esters of acrylic acid, methacrylic acid, etc. Higher alkyl esters in which R' has 9 or more carbon atoms are not suitable because these esters are difficult to dissolve in water and when said higher alkyl esters are copolymerized with the other monomer in an organic solvent and after neutralization the solvent is replaced by water, as will be hereinafter described more fully, the resultant polymer tends to agglomerate into a lump form or slurry state. Suitable alkyl groups are methyl, ethyl, propyl, isopropyl, butyl, isobutyl, hexyl, octyl, 2-ethylhexyl and the like, and more preferable alkylesters are methyl, ethyl, propyl, isopropyl, butyl and isobutyl esters which give copolymer easily dissolved in water. That is, these are alkyl esters in which R' is an alkyl group having 4 or less carbon atoms.

Suitable esters, in which R' in —COOR' is a hydroxyalkyl group, are, for example, 2-hydroxyethyl ester, hydroxypropyl ester, polypropylene glycol monoester, and polyethylene glycol monoester of acrylic acid and methacrylic acid, etc. These esters are monomers as reactive as are the monomers having —CONH₂ group of methylol- or alkoxymethyl-substituted —CONH₂ group for X. The reactive hydroxyalkyl esters take part in the formation of a three-dimensional net work structure in the electrodeposited film by esterification with the α,β-unsaturated carboxylic acid in the polymer molecule, or intramolecular co-condensation, or the formation of a three-dimensional net work linkage with the methylol melamine derivatives which are sometimes used in the present composition. The formation of three-dimensional net work in the film leads to the improvement in toughness, corrosion resistance, and other protective performance of the film after baking.

As the monomers, in which X is —CONH$_2$ group or methylol- or alkoxymethyl-substituted —CONH$_2$ group, there are used, for example, methylol acrylamide, methoxymethyl acrylamide, butoxymethyl acrylamide, methylol methacrylamide, methoxymethyl methacrylamide, butoxymethyl methacrylamide, etc.

R'' in —OCOR'' is a lower alkyl group having preferably 1 to 3 carbon atoms. Examples of monomers having such a group are vinyl acetate, vinyl propionate, etc.

Examples of monomers, in which X is —CN group, are acrylonitrile, methacrylonitrile, etc.

R''' in the

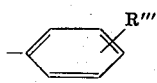

group is a hydrogen atom, or a lower alkyl group having preferably 1 to 2 carbon atoms. Examples of such monomers are styrene, vinyl toluene, α-methylstyrene, and other vinyl monomers.

The α,β-ethylenically unsaturated monomers, described above, may be used alone or in admixture of two or more. However, it is necessary for the monomer to occupy 95 to 70 percent by weight in the resultant polymer. When the proportion of said monomer in the polymer exceeds 95 percent, the content of hydrophilic group in the polymer, based upon the ammonium or amine salt of α,β-ethylenically unsaturated carboxylic acid copolymerized with said monomer, becomes too small to render the polymer sufficiently soluble in water, resulting in formation of lumps and coagulated sediments in an aqueous medium. On the contrary, in case the proportion of α,β-ethylenically unsaturated monomer falls below 70 percent by weight, the uniformity of electrodeposited film becomes unsatisfactory. Consequently, 95 to 70 percent by weight of α,β-ethylenically unsaturated monomer in the polymer is required. 5 to 30 percent by weight thereof is preferably occupied by at least one reactive monomer mentioned above, such as hydroxyalkyl acrylates, hydroxyalkyl methacrylates, acrylamide, or alkoxymethyl methacrylamide. The incorporation of the reactive monomers alone or in admixture of two or more into the polymer improves the corrosion resistance and other protective performance of the finished coating by three-dimensional crosslinking of the functional groups present in the electrodeposited film caused upon baking subsequent to washing of the film, said crosslinking including one component type co-condensation and ether interchange reaction with derivatives of methylol melamine if present.

The other component of the soluble copolymer is an α,β-ethylenically unsaturated carboxylic acid, such as for example, acrylic acid, methacrylic acid, itaconic acid, maleic acid, fumaric acid, aconitic acid, citraconic acid, crotonic acid, etc., which are used alone or in admixture of two or more. Among said carboxylic acids, there are particularly preferable acrylic acid, methacrylic acid and maleic acid. After polymerization, these α,β-ethylenically unsaturated carboxylic acids in the polymer are usually neutralized with ammonia or amines to form salts, as will be described hereinafter, and these salts are responsible to the conversion of the copolymer into a soluble form. The proportion of the carboxylic acid in the polymer must be 5 to 30 percent by weight. In case the proportion falls below 5 percent by weight, the copolymer, after being neutralized with ammonia or an amine, becomes no longer soluble in water or extendable with water so that it becomes difficult to obtain a homogeneous aqueous solution of the copolymer owing to the occurrence of lumps and coagulated sediments when the organic medium, in which polymerization and neutralization had been carried out, is replaced by water. When there is used for electrodeposition coating a diluted aqueous composition, prepared by using a copolymer containing more than 30 percent by weight of said carboxylic acid in a salt form, the dissociated ammonia or amine will be recombined with the carboxylic group in the electrodeposited film upon interruption of the electric current, to cause either redissolution of the film whereby the formation of coating is made impossible, or if formed, the coating is not a continuous film and is poor in protective performances, and corrosion resistance.

It is advantageous to use said soluble vinyl copolymer in combination with a methylol melamine derivative which is compatible with the former. A water-soluble aminoplast resin comprising etherified methylol melamine in which two or more methylol groups are etherified with a lower aliphatic alcohol, is compatible with said vinyl copolymer and shall be called herein a compatible methylol melamine derivative. Unetherified methylol melamine and partially etherified methylol melamine of which only one methylol group is etherified, condense themselves in the presence of an acid into an insoluble resin, whereas methylol melamine partially or completely etherified with a lower aliphatic alcohol such as methanol, ethanol and propanol, is readily soluble in water and do not easily condense into a polymer in the presence of an acid. Methylol melamine etherified with an alcohol having a low solubility in water, such as butyl alcohol, becomes turbid on dilution with water.

When used in combination with said vinyl copolymer, the compatible methylol melamine derivative distinctively exhibits its crosslinking ability to produce a film having three-dimensional net work structure, thereby enhancing the toughness and resistance to water and chemicals. Compatible methylol melamine derivatives are effectively used in an amount of 10 to 30 percent by weight based on the weight of the soluble vinyl copolymer.

A typical procedure for preparing the soluble vinyl copolymer is as follows:

5 to 30 parts by weight of at least one α,β-ethylenically unsaturated carboxylic acid and 95 to 70 parts by weight of a mixture of α,β-ethylenically unsaturated monomers, such as a mixture of ethyl acrylate and β-hydroxyethyl methacrylate, are dissolved in a water-soluble lower aliphatic alcohol alone or an admixture of two or more thereof. After addition of 1 to 2 percent by weight (based on total weight of monomers) of a free-radical polymerization initiator such as benzoyl peroxide or azobisisobutyronitrile, the solution is heated at 60° to 80° C. for more than 8 hours to polymerize the monomers. Then ammonia or a water-soluble amine is added to the resultant solution of vinyl copolymer to neutralize carboxylic groups of the copolymer. Examples of suitable amines are for example alkylamines such as ethylamine, diethylamine, propylamine, isopropylamine, dipropylamine, diisopropylamine, N-butylamine, dimethylaminopropylamine, diethylpropylamine; alkylenediamines such as ethylene-diamine, propylenediamine; alkanolamines such as monoethanolamine, N-butanolamine, aminomethylethanolamine, aminoethylethanolamine, monoisopropanolamine, morpholine, N-methylmorpholine, dimethylmorpholine, N-ethylmorpholine; and polyamines such as diethylenetriamine. The alcohol used as solvent is removed from the neutralized solution by distillation and purified water such as conductivity water is added to obtain an aqueous solution of the vinyl copolymer. Complete removal of the alcohol is not necessary, whereas to obtain satisfactory results the conductivity of said aqueous solution should preferably be nearly the same as that of the aqueous solution of soluble chromogen-bonded polymer.

The chromogen-bonded polymer used in this invention can be synthesized in the following ways:

I. An α,β-ethylenically unsaturated carboxylic acid, alone or in admixture with other α,β-ethylenically unsaturated monomers, is polymerized using as a polymerization initiator a free radical of chromogen or chromogen intermediate formed from the diazonium salt of a chromogen or a chromogen intermediate on decomposition of said diazonium salt by the action of heat or light, or by the change of pH, whereby at the same time the covalent bond is formed between the resultant polymer with the chromogen or its intermediate, resulting in a chromogen-bonded polymer or a chromogen intermediate-bonded polymer. The latter is thereafter converted into chromogen-bonded polymer by the developing treatment. (cf. U.S. Pat. No. 3,344,098).

II. A chromogen or a chromogen intermediate having an α,β-ethylenically unsaturated group is copolymerized with an α,β-ethylenically unsaturated carboxylic acid or a mixture thereof with other α,β-ethylenically unsaturated monomers by the aid of known polymerization initiator. Examples of said α,β-ethylenically unsaturated group are

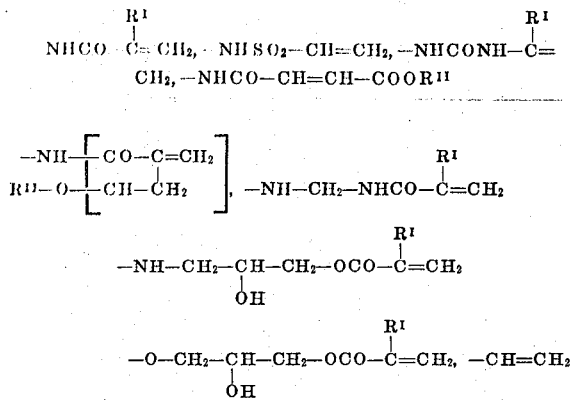

wherein $R^I$ is a hydrogen atom or $-CH_3$ and $R^{II}$ is a hydrogen atom or an alkyl group. The resultant copolymer is a chromogen-bonded polymer or a chromogen intermediate-bonded polymer, in which chromogen or chromogen intermediate is attached by covalent bond to the main molecular chain of copolymer as side chains. The chromogen intermediate-bonded polymer is thereafter converted into chromogen-bonded polymer by the developing treatment.

The chromogen-bonded polymer thus obtained is converted into a salt thereof by neutralizing the carboxylic groups of the polymer with equivalent amount of an amine or ammonia water. Also, by using an amine salt or ammonium salt of α,β-ethylenically unsaturated carboxylic acid as the starting material instead of the free carboxylic acid in both methods (I) and (II), it is possible to obtain directly a corresponding salt of chromogen-bonded polymer. These salts of chromogen-bonded polymer are soluble in water.

In both methods (I) and (II), the developing treatment of each chromogen intermediate-bonded polymer is carried out by any known method suitable for each intermediate used. When a coupling component of an azo color is used as the chromogen intermediate, the resultant coupling component-bonded polymer can be coupled with an aromatic diazonium compound or an aromatic diazo-amino compound in usual way, to be converted into chromogen-bonded polymer, which chromogen being that of an azo color.

In the preparation of chromogen-bonded polymer employed in the present invention, a variety of known dyes and pigments and intermediates thereof can be used as the chromogen and the chromogen intermediate. Examples are dyes and pigments such as phthalocyanine group, anthraquinone group, perinone group, perylene group, indigo group, thioindigo group, dioxazine group, quinacridone group, azo group including azo-coupling type and polyazo type, carbon black, aniline black, etc.; intermediates for azo color such as phenols, naphthols, oxynaphthalic acid arlylamides, phenylpyrazolones, acetoacetoarylamides, etc.

Examples of chromogen having diazonium group are copper phthalocyanine blue tetradiazonium salt, copper phthalocyanine blue tri-diazonium salt, copper phthalocyanine blue di-diazonium salt, halogenated copper phthalocyanine tetra-diazonium salts, sulfonated copper phthalocyanine tri-diazonium salt, cobalt phthalocyanine tetra-diazonium salt, sulfonated cobalt phthalocyanine tri-diazonium salt, nickel phthalocyanine tetra-diazonium salt, iron phthalocyanine tetra-diazonium salt, isophthal-bis{4-[p-(diazonium salt)-benzoylamino]anthraquinonyl-1-amide}, isophthal-{4-[p-(diazonium salt)benzoylamino]-anthraquinonyl-1-amide}-{5'-[p-(diazonium salt)benzoylamino]-anthraquinonyl-1'-amide}, terephthal-bis{5-[p-(diazonium salt)benzoylamino]anthraquinonyl-1-amide}, 2,4,6-tris[4-(diazonium salt)anthraquinonyl-(-1-)amino]-s-triazine, 2,4,6-tris{4-[p-(diazonium salt)benzoylamino]anthraquinonyl-(-1-)amino}-s-triazine, indanthrone diazonium salt, flavanthrone diazonium salt, C.I. vat yellow-20 diazonium salt, C.I. vat orange 7 diazonium salt, C.I. vat red 15 diazonium salt, N,N'-bis(3',5'-dimethylphenyl)-perylene-3,4,9,10-dicarboimide diazonium salt, 4,7,4',7'-tetrachlorothioindigo diazonium salt, C.I. vat red 1 diazonium salt, dioxazine violet diazonium salt, linear transquinacridone diazonium salt, 2,9-dimethyl linear quinacridone diazonium salt, 3,5-dichloro-4-(diazonium salt)phenyl-azo-2-hydroxy-3-naphthoic acid-(3'-diazonium salt)anilide, 2'-methoxy-5'-benzoylamidophenyl-azo-2-hydroxy-3-naphthoic acid-(3'-diazonium salt)anilide, anthraquinonyl (-1'-)-azo-2-hydroxy-3-naphthoic acid-(3'-diazonium salt)anilide, 3',5'-dichloro-4'-(diazonium salt)phenyl-azo-1-[3'-(diazonium salt)phenyl]-3-methyl-5-pyrazolone, 3,3'-dichlorodiphenyl-(4,4')-bisazo-bis-{acetoaceto[2-methyl-4-(diazonium salt)]anilide}, 1,4-bis{3'-[3'',5''-dichloro-4'''-(diazonium salt)-phenyl-azo-acetoacetamino]-4'-chlorobenzoyl}-2,5-dichlorophenylenediamide, 1,4-bis{3'[3'',5''-dichloro-4'''-(diazonium salt)-phenyl-azo-acetoacetamino]-4'-chlorobenzoyl}-2,5-dimethylphenylenediamide, carbon black diazonium salt, aniline black diazonium salt.

Examples of chromogen having α,β-ethylenically unsaturated group are 3,5-dichloro-4-(acrylamido)phenyl-azo-2-hydroxy-3-naphthoic acid-(3'-acrylamido)anilide, 2'-methoxy-5'-benzoylamidophenyl-azo-2-hydroxy-3-naphthoic acid-(3'-methacrylamido)anilide, 3',5'-dichloro-4'-(methacrylamido)phenyl-azo-1-[3'-(methacrylamido)phenyl]-3-methyl-5-pyrazolone, and 3,3'-dichlorodiphenyl-(4,4')-bisazo-bis{acetoaceto[2-methyl-4-(itaconylamino)]anilide}.

Examples of chromogen intermediate having diazonium group are 2-hydroxy-3-naphthoic acid-(3'-diazonium salt)-anilide, 2-hydroxy-3-naphthoic acid-(4'-diazonium salt)-anilide, 2-hydroxy-3-naphthoic acid-(2'-methyl-5'-diazonium salt)anilide, 2-hydroxy-6-(diazonium salt)-3-naphthoic acid, naphthol(1)-5-diazonium salt, naphthol-(2)-5-diazonium salt, 8-(diazonium salt)-1-naphthol-3,6-disulfonic acid, 1-[3'-(diazonium salt)phenyl]-3-methyl-5 -pyrazolone, 1-[4'-(diazonium salt)phenyl]-3-methyl-5-pyrazolone, and acetoaceto(4-diazonium salt)anilide.

Examples of chromogen intermediate having α,β-ethylenically unsaturated group are 2-hydroxy-3-naphthoic acid-(3'-methacrylamido)anilide, 2-hydroxy-3-naphthoic acid-(4'-acrylamido)anilide, 2-hydroxy-6-(methacrylamido)-3-naphthoic acid, 5-methacrylamidonaphthol(2), 8-methacrylamido-1-naphthol-3,6-disulfonic acid, 1-[3'-(methacrylamido)phenyl]-3-methyl-5-pyrazolone, and acetoaceto-(4-methacrylamido)anilide.

Examples of compounds which are diazotized to be used in developing chromogen intermediate-bonded polymer prepared by use of a chromogen intermediate of azo color, are o-chloroaniline, m-chloroaniline, o-nitroaniline, m-nitroaniline, 5-amino-1,3-bistrifluoromethylbenzene, o-(phenylsulfonyl)-aniline, 4-chloro-3-amino-1-trifluoromethylbenzene, 2-ethylsulfonyl-5-trifluoromethyl-aniline, 2,5-dichloroaniline, p-nitro-o-toluidine, p-nitro-o-anisidine, 6-chloro-2-toluidine, 4-benzylsulfonyl-o-anisidine, 5-chloro-2-amino-1-trifluoromethylbenzene, β-naphthylamine, p-chloro-o-nitroaniline, p-nitroaniline, m-nitro-p-toluidine, p-chloro-o-toluidine, 5-chloro-o-toluidine, 5-nitro-o-toluidine, 4-chloro-2-anisidine, 5-nitro-o-anisidine, o-anisidine-4-sulfon-n-butylamide, o-anisidine-4-sulfondiethylamide, 4-ethylsulfonyl-o-anisidine, 6-benzamido-m-4-xylidine, 2-aminodiphenyl, 4-chloro-2-amino-diphenyl ether, 4,4'-dichloro-2-aminodiphenyl ether, α-aminoanthraquinone, m-nitro-p-anisidine, 4-amino-2,5-dimethoxybenzonitrile, α-naphthylamine, 4-chloro-6-benzamido-m-anisidine, benzidine, 2,6-dichloro-p-phenylenediamine,

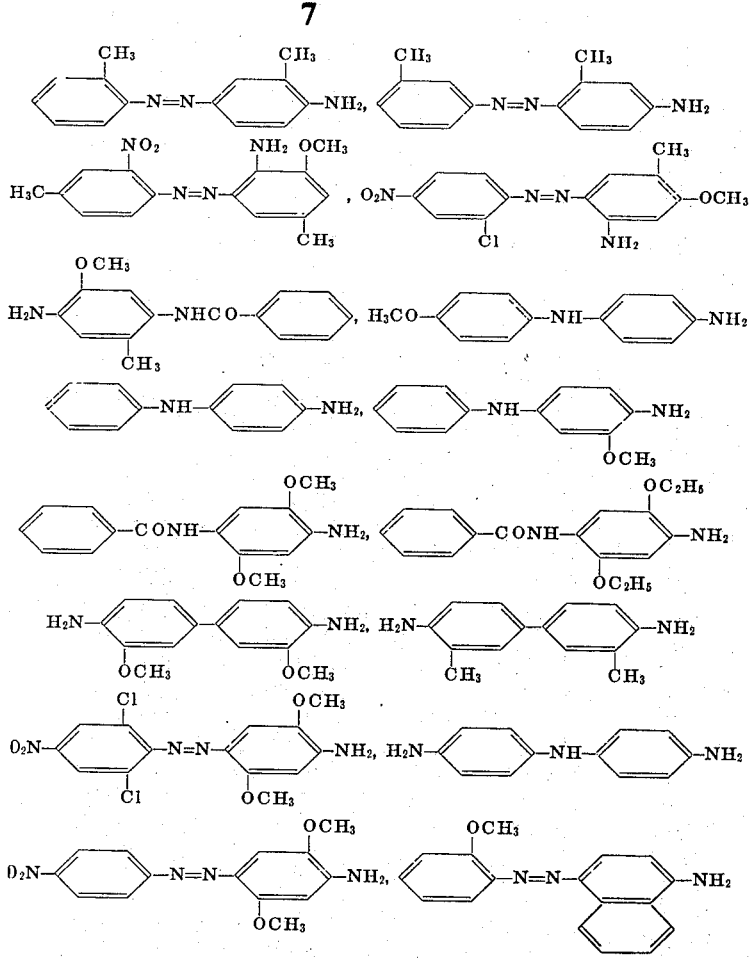

The proportion of chromogen in chromogen-bonded polymer is 1 to 50 percent, preferably 5 to 35 percent by weight.

A variety of α,β-ethylenically unsaturated monomers, as will be described below, are used in the preparation of chromogen-bonded polymers employed in this invention.

α,β-ethylenically unsaturated carboxylic acids frequently used are for example acrylic acid, methacrylic acid, crotonic acid, itaconic acid, maleic acid, fumaric acid, etc. Acid halides and acid anhydrides thereof which are readily convertible into said carboxylic acids are also used.

Other α,β-ethylenically unsaturated monomers, which are used if required, may be classified according to their effect upon the chromogen-bonded polymer as follows:

a. α,β-ethylenically unsaturated monomers having functional groups, which are capable of forming a net-work structure in the polymer by means of after-treatment: for example, N-methylol acrylamide, N-methylol methacrylamide, alkoxymethyl derivatives of these amides, glycidyl methacrylate, etc.

b. α,β-ethylenically unsaturated monomers having reactive groups, which are capable of forming a net-work structure in the polymer by the aid of crosslinking agents: for example, acrylamide, methacrylamide, 2-hydroxyethyl-methacrylate, hydroxypropylmethacrylate, etc.

c. α,β-ethylenically unsaturated monomers having no reactive groups being capable of improving the physical properties of the coating, such as flexibility, adhesiveness, bending characteristics, processability, and resistances to abrasion, water and solvent: for example, alkyl acrylate (alkyl having 1 to 8 carbon atoms), alkyl methacrylate (alkyl having 1 to 8 carbon atoms), vinyl alkylcarboxylate (alkyl having 1 to 8 carbon atoms), styrene, acrylonitrile, methacrylonitrile, etc.

The aqueous composition for electrodeposition-coating of the present invention can be prepared in an alternative way as follows: 5 to 30 parts by weight of at least one α,β-ethylenically unsaturated carboxylic acid and 95 to 70 parts by weight of at least one α,β-ethylenically unsaturated monomer are copolymerized in water-soluble lower aliphatic alcohol containing the soluble chromogen-bonded polymer, and the resultant copolymer is neutralized to be converted into a soluble salt, and then alcohol is replaced by water to give said aqueous composition.

The water-soluble chromogen-bonded polymer itself acts as a colorant, but has only a low film-forming property, through it seems at a glance from its structure that it can act as a film-forming component. The polymer part of said chromogen-bonded polymer only takes part in imparting an increased water-solubility to the chromogen. When used alone as the film forming material, this chromogen-bonded polymer is unable to produce a coating satisfactory in corrosion resistance and other protective performances for practical application. Moreover, in actual practice, from aesthetic point of view various color concentrations are required in relation to hue, value and chroma of the coating, which can not be met with by the chromogen-bonded polymer used alone as the film forming material. Therefore the chromogen-bonded polymer is used in the present invention as a stainer to adjust the color of the coating to a given hue, value and chroma.

In preparing an aqueous composition for electrophoretic coating, it is necessary to use the chromogen-bonded polymer in combination with a film forming material which is uniformly soluble in an aqueous medium and is able to move electrophoretically along with the chromogen-bonded polymer toward the substrate used as anode to coat the substrate in uniform color. The coating produced by use of such a composition is fast to light even under long outdoor exposure, and is at the same time, decorative, corrosion-resistive and protective.

The aqueous dispersion of pigment used in the present invention is obtained by dispersing the pigment with a nonionic or anionic surface active agent in water.

In preparing said aqueous dispersion known organic and inorganic pigments are used. Examples of organic pigments used are those of phthalocyanine group, anthraquinone group, perinone group, perylene group, indigoids, thioindigoids, dioxazine group, quinacridone group, coupling-azo group, polyazo group, other azo groups, carbon black, aniline black, etc. Representative examples of inorganic pigments used are titanium dioxide, chrome yellow, molybdate red, red iron oxide, yellow ochre, ultramarine, chromium oxide green, cadmium yellow, cadmium red, cobalt blue, clay, calcium carbonate, barium sulfate, etc.

The surface active agents used in the invention are known nonionic and anionic type. Examples of nonionic surface active agents used are those of polyethylene glycol type such as polyethylene glycol-alkylesters, -alkylethers, -alkyl phenyl ethers, -alkylamides, etc.; sorbitan type; and partial ester of polyhydric alcohol such as partial fatty acid ester of polyhydric alcohol, etc. Examples of anionic surface active agent used are ammonium or amine salt of aliphatic carboxylic acids; ammonium or amine salt of sulfuric acid esters such as alkyl sulfates and sulfate oils; and ammonium or amine salt of sulfonic salt such as alkylsulfonic acids and arylsulfonic acids.

Said aqueous dispersion is prepared by grinding or pulverizing pigments with water and surface active agents by means of pulverizing mills such as colloid mill, sand mill, ball mill, roller mill, "Attritor", etc.

Suitable content of inorganic pigments in said aqueous dispersion is somewhat different from that of organic pigments. But the content of both pigments is within the range 5 to 70 percent, preferably 10 to 50 percent by weight. The amount of surface active agents added is 1 to 100%, preferably 1 to 40 percent by weight based on the weight of pigments. When inorganic pigments are used protective colloids such as polyvinyl alcohol, methylcellulose, ethylcellulose, etc., may be added in small amount, in addition to the surface active agents.

The suitable proportion of said aqueous dispersion of pigment to the film forming material is as follows:
for organic pigment, less than 5 parts, preferably less than 2 parts of pigment, (as solid) per 100 parts of film forming material (as solid); for inorganic pigment, less than 50 parts, preferably less than 30 parts by weight of pigment (as solid) per 100 parts by weight of film forming material (as solid). When 1 part by weight or less of organic pigment or less than 15 parts by weight of inorganic pigment are used per 100 parts by weight of film material, the coating obtained will show a transparent appearance.

In the case where a mixture of the soluble chromogen-bonded polymer and the aqueous dispersion of pigment is used, for 100 parts by weight of film forming material less than 20 parts (as solid) of soluble chromogen-bonded polymer and less than 30 parts, preferably less than 10 parts by weight of inorganic pigment or less than 3 parts, preferably 1 parts or less of organic pigment should be used.

When relatively deep color together with transparency is desired for the coating, it is more preferable to increase the amount of soluble chromogen-bonded polymer in said mixture of colorant.

According to the present invention, the electrophoretic coating is carried out using the composition of the invention in a concentration of 10 to 20 percent by weight of solid matter prepared by diluting with conductivity water. The diluted composition is introduced in a cell. The substrate made of a conductive material is used as the anode. The cathode is placed in counterposition to the anode, and electric circuit is properly arranged. When a direct current is passed through the composition at a potential of 30 to 150 v., preferably 40 to 100 v., the colorant and the film forming material in the composition move toward anode as the result of electrolysis and electrophoresis, and an electrodeposited coating is produced on the surface of the substrate. The coated substrate is removed from the cell, washed with water, and cured in a hot air oven, to give a perfect coating of three-dimensional network structure.

When the electrode potential is below 30 v. the coloring of the substrate is hardly recognizable and the deposited film is too thin to be of practical value. When the potential is increased above 150 v. pinholes and orange peels appear on the surface of the deposited film to damage the smoothness of the coating, and transparency decreases owing to the increased thickness of the film. Within the preferred potential range of from 40 v. to 100 v. the deposited film is uniform in color and a smooth coating with excellent appearance of transparency is obtained.

Since the potential used in the present method is below 150 v. the investment cost can be lower and the safety in operation can be secured more easily than those in prior methods. After being electrophoretically deposited, the coating is baked preferably at a temperature of 120° to 230° C. for 15 to 30 minutes.

In the present composition for colored coating there is used a combination of the soluble chromogen-bonded polymer and the soluble vinyl copolymer, or a single composite consisting of these polymers to the effect that in the practical operation, the electrodeposition-coating can be repeated many times successively using single and the same bath containing the present composition, without causing any variation in the composition of the deposited film or any change in the evenness and shade of color. Another advantage of the present composition is the transparent appearance of the colored film electrodeposited therefrom, which is essentially different from the conventional coating produced by dipping or spraying method using a composition containing conventional dyes or pigments. The present composition can be added with pigments such as titanium dioxide, barium chromate, strontium chromate, etc. to given a coating superior in corrosion resistance and color-fastness.

The electrodepostion-color-coating composition, comprising the soluble vinyl copolymer and the aqueous dispersion of pigment, has the following advantages:

1. Since the pigment particles in said aqueous dispersion has been surface-treated with a surface active agent, they have strong affinity to the film forming material, which is the vinyl copolymer having both hydrophilic groups and lipophilic groups, resulting in more uniform deposition than untreated particles.
2. Treatment of pigment with a surface active agent improves the dispersibility and the stability against flocculation of the pigment and the storage stability of the dispersion.
3. Compared with the case, where the untreated pigment is mixed with the film forming material by means of mixing mill, the pigment in said aqueous dispersion is previously dispersed in a condition most suitable to be dispersed in the aqueous medium so that more satisfactory dispersion of pigment can easily be obtained without regard to the kind of film forming material or the ratio of pigment to the film forming material.
4. As the surface properties are made uniform with the surface active agent, the compatibility among different kind of pigments and the compatibility of the pigment with a film forming material are both increased. As a result a uniform coating is always obtained.
5. A coating excellent in weather and corrosion resistance and in protective performances can be obtained. By selection of proper amount of pigment, it is also possible to obtain a transparent coating which can exhibits original metallic lustre of the substrate metal.

A combination of the aqueous dispersion of pigment and the soluble chromogen-bonded polymer has following advantages as a colorant.

6. The soluble chromogen-bonded polymer is a chemical compound in which a chromogen is bonded to a vinyl polymer having hydrophilic group, and the aqueous dispersion of pigment contains pigment which is surface-treated with a surface active agent. Consequently, these two colorants have strong affinities not only to each other but also to the film forming material which is a vinyl copolymer having both hydrophilic group and lipophilic group. Therefore, in the case where said combination of colorants is used more uniform coating can be obtained than in the case where untreated pigment is used instead of said aqueous dispersion.
7. The soluble chromogen-polymer is either soluble or dispersible in water in colloidal state, and the pigment in the aqueous dispersion is surface treated with a surface active agent. Consequently, both colorants have in common high dispersibility, stability against flocculation, and storage stability.

8. Compared with the case where an untreated pigment is ground with the film forming material, the pigment in said aqueous dispersion is previously dispersed in a condition most suitable to be dispersed in the aqueous medium, and the soluble chromogen-bonded polymer is either soluble in water or dispersible in colloidal state, so that more satisfactory dispersion of colorants in the film forming material can easily be obtained without regard to the kind of film forming material or the ratio of colorant to the latter.

9. A coating excellent in weather and corrosion resistance and in protective performances can be obtained. Owing to the combined used of the chromogen-bonded polymer the transparency of the coating is particularly excellent to exhibit original metallic lustre of the substrate metal.

In the present invention there is used a combination of the soluble vinyl copolymer, the aqueous dispersion of pigment, and the soluble chromogen-bonded polymer to the effect that in the practical application, the electrocoating can be repeated many times successively using single and the same bath containing said combination, without causing any variation in the composition of the deposited film or any change in the evenness and shade of color. Another advantage is the transparent appearance of the colored film electrodeposited therefrom, which is essentially different from the conventional coating produced by dipping or spraying method using a composition containing conventional dyes or pigments.

The invention will be further illustrated with reference to the following examples which, however, should not be considered as limiting. Unless otherwise noted, the parts and percentages therein are by weight.

EXAMPLE 1

5 Parts of ethyl acrylate, 4 parts of maleic anhydride, 1 part of acrylic acid, 2 parts of acrylamide, and 1 part of polyethylene glycol nonylphenyl ether were mixed with 87 parts of water while being agitated, resulting in an emulsion. 77 Parts of an aqueous solution containing 3 percent of copper phthalocyanine blue tri-diazonium chloride were added to the emulsion, and the mixture was heated to 57° C. during a period of one and a half hours and maintained at this temperature for further one and a half hours while being agitated to complete the polymerization reaction. After filtration and washing, a chromogen-bonded polymer was obtained in a paste form. The paste was dispersed in conductivity water, neutralized with triethanolamine, and purified with an anion-exchange resin, to obtain an aqueous solution containing 10 percent of a blue colorant. A 5 percent-aqueous solution of said colorant, i.e. a blue soluble chromogen-bonded polymer, had a pH value of 8.33 and a conductivity value of $0.150 \times 10^4$ $\mu\sigma$/cm at 20° C.

On the other hand, 100 parts of isopropanol were heated to 70° C. in a glass reactor provided with a stirrer, a thermometer, a reflux condenser, and a dropping funnel. A mixture of 59 parts of butyl acrylate, 21 parts of methyl methacrylate, 12 parts of N-methylol acrylamide, and 8 parts of acrylic acid, containing as a polymerization initiator 1 part of 2,2'-azobisisobutyronitrile, has been added to said isopranol maintained at 70° C. over a period of about 6.5 hours. After further 2 hours of heating at 70° C. when the polymerization reaction has been complete, the reaction mixture was neutralized with triethylamine of the amount sufficient to neutralize the acrylic acid contained in the polymer molecule, and heated at the same temperature with stirring for further a half hour, to produce a vinyl copolymer soluble in water. A 12 percent aqueous solution of said copolymer had a pH value of 8.01 and a conductivity value of $0.148 \times 10^4$ $\mu\sigma$/cm at 20°C.

100 parts of a 12 percent-aqueous solution of said vinyl copolymer were mixed with 1 part of a 5 percent-aqueous solution of the above-obtained blue chromogen-bonded polymer, to prepare a colored aqueous composition for electrocoating. The aqueous composition obtained was transferred to a 6 $l$-glass cell for electrocoating provided with an aluminum anode plate and a stainless-steel cathode plate, each having a surface area of 100 cm$^2$ and placed parallel to each other 10 cm apart. A direct current was passed through the cell for 3 min. at a constant voltage of 50 v., an initial current being 0.83 amp. and total quantity 13.5 coulombs. A uniform blue electrocoating was obtained. After washing and baking at 150° C. for 30 min. in a hot air oven, the coating, 27 microns in thickness and weighing 265.4 mg/dm$^2$, had a transparent blue color corresponding to the color specification of 2.5B (hue) 6 (value)/8 (chroma) according to JIS Z–8721. 200 Aluminum specimens of the same size (2 m$^2$ in total surface area) were electrocoated in the same cell under the same conditions as those used above. The following results were obtained, the individual value thereof being distributed within a narrow range, and non-uniformity in color was never observed; initial current, 0.76–0.83 amp.; quantity of electricity for each coating, 11.9–13.5 coulombs; weight of coating, 248.1–265.4 mg/dm$^2$; color of the coating, 2.5 B (hue) 6 (value)/8 (chroma).

The coated specimens were irradiated by ultra-violet rays for 200 hours in a color-fastness tester made by Toyo Rika without showing any change in hue, value and chroma.

A colored aqueous composition was prepared, which was similar to that described above except for the use of a blue dye ("Alimax Blue BGN", trade-name, made by I.C.I. Ltd.), commonly used for coloring aluminum and anodized aluminum, in place of the above-mentioned soluble chromogen-bonded polymer. Aluminum specimens were treated in this aqueous composition in the same way as above, to obtain only a blistered coating which was useless in actual practice. A similar composition containing "Aloxane Light Blue R2LF" (trade-name, made by Compagnie Olivier) as a colorant was found also useless in producing a colored coating by electrodeposition, because said dye had been unsusceptible to electrophoresis.

EXAMPLE 2

100 Parts of the soluble vinyl copolymer, the same as that used in Example 1, prepared by neutralizing with triethylamine a copolymer obtained from 59 parts of butyl acrylate, 21 parts of methyl methacrylate, 12 parts of N-methylol acrylamide, and 8 parts of acrylic acid, were mixed with 20 parts of hexamethoxymethylol melamine, and diluted with conductivity water to produce a 15 percent-aqueous solution, having a pH of 7.90 and a conductivity of $0.142 \times 10^4$ $\mu\sigma$. 100 parts of said 15 percent-aqueous solution were mixed with 1 part of a 5 percent-aqueous solution (pH, 8.33; conductivity, $0.150 \times 10^4$ $\mu\sigma$/cm) of the chromogen-bonded polymer obtained in Example 1, which chromogen is the copper phthalocyanine type. The resultant aqueous composition was placed in the same cell as that used in Example 1, and a direct current was passed through the solution for 3 min. at a constant electrode potential of 50 v. to deposit on the anode a uniform blue film weighing 294.5 mg/dm$^2$, an initial current being 0.73 amp. and total quantity of current used being 12.9 coulombs. The coating, after being baked in the same way as in Example 1, had a transparent color corresponding to that of 2.5 B (hue), 6 (value) / 8 (chroma).

One turnover of the electrocoating treatment was repeated using aluminum specimens of the same size as those used in Example 1, without causing any difference. The sward rocker hardness of the deposited film was 23, as measured according to JIS K–5650 (general testing method for amino-alkyd resins). Also, the hardness corresponded to 3H grade of "Mitsubishi Uni" pencil (trade-name, Mitsubishi Pencil Co.; the same shall apply hereinafter). The film showed a corrosion resistance of more than 500 hours in the salt spray test according to JIS Z–2371.

EXAMPLE 3

1.2 Parts of ethylacrylate, 1.8 parts of acrylic acid, 3 parts of maleic anhydride, 0.6 part of n-dodecyl mercaptan, 9 parts of sodium hypophosphite monohydrate, and 18 parts of water were added to 54 parts of an aqueous dispersion containing 7.3% of 2,4,6-tris[4'-(diazonium-dodecylbenzenesulfonato)antraquinonylamino(-1')-s-triazine, and the mixture was heated to 70° C. in one hour, and then subjected to the polymerization reaction for further 2 hours. The resultant chromogen-bonded polymer was filtered and washed to obtain a paste, which was then dispersed in conductivity water. The dispersion was converted into a homogenous solution by the addition of triethylamine and methanol, and purified with an anion-exchange resin, to obtain an aqueous solution of a yellowish brown colorant. The aqueous solution containing 5 percent of said colorant, i.e. the soluble chromogen-bonded polymer, had a pH of 8.7 and a conductivity of $0.187 \times 10^4$ $\mu\mho$/cm at 20° C.

On the other hand, 66.7 parts of isopropanol were heated to 70° C. in a glass reactor provided with a stirrer, a thermometer, and a reflux condenser. A mixture of 65 parts of isobutyl acrylate, 15 parts of methyl methacrylate, 12 parts of 2-hydroxyethyl methacrylate, and 8 parts of acrylic acid, containing as a polymerization initiator 1 part of 2,2'-azobisisobutyronitrile, was added in ten portions to said isopropanol, each portion being added every 45 min. After addition of the final portion, the mixture was allowed to react for further 3 hours at 70°–76° C. to complete the polymerization. The reaction product was neutralized with dimethylethanolamine of the amount sufficient to neutralize the acrylic acid contained in the polymer molecule, and heated at the same temperature with stirring for further a half hour, to produce a vinyl copolymer soluble in water. 70 Parts of the copolymer thus obtained and 30 parts of pentamethoxymonobutoxymethylol melamine were dissolved in conductivity water to give a 12 percent-aqueous solution having a pH of 7.85 and a conductivity of $0.177 \times 10^4$ $\mu\mho$/cm at 20° C.

90 Parts of said 12 percent-aqueous solution of soluble copolymer were mixed with 10 parts of a 5 percent-aqueous solution (pH, 8.33; conductivity $0.187 \times 10^4$ $\mu\mho$/cm) of the chromogen-bonded polymer obtained above, which chromogen is the anthraquinone type. The resultant aqueous composition was placed in the same cell as that used in Example 1, and a direct current was passed through the solution for 1 minute at a constant electrode potential of 70 v., to deposit on the anode a uniform yellow film weighing 235.1 mg/dm², an initial current being 0.48 amp. and total quantity being 10.6 coulombs. The coating after being baked at 200° C. for 15 min. had a transparent yellow color corresponding to that of 2.5 Y (hue), 8 (value) / 12 (chroma).

200 Aluminum specimens of the same size (2 m² in total surface area) were successively electrocoated in the same cell under the same conditions as those used above, to obtain following results: initial current, 0.40 – 0.48 amp.; total electricity, 10.6 – 11.2 coulombs; weight of coating, 220.3 – 235.1 mg/dm²; color of each coating, 2.5 Y (hue), 8 (value) / 12 (chroma). It is clear from the results that there is substantially no variation among successive coatings.

Each coated specimen was irradiated by ultra-violet rays for 200 hours in a color-fastness tester "Fademeter" made by Toyo Rika Instruments, Inc. without showing any change in hue, value and chroma.

The hardness of the deposited film was 26, as measured according to JIS K-5650. Also, the hardness corresponded to grade 3H of "Misubishi Uni" pencil. The film showed a corrosion resistance of more than 500 hours in the salt spray test according to JIS Z-2371.

For comparison, a trial electrophoretic coating was conducted under the same conditions as above, using the above-mentioned soluble anthraquinone-type-chromogen-bonded polymer alone. There was obtained a non-transparent thin coating without commercial value.

EXAMPLE 4

An aluminum specimen similar to that used in Example 3 was chemically polished (immersing in an aqueous solution containing 50 percent of phosphoric acid and 10 percent of nitric acid at 90° C. for 5 min.) to be used as an anode. By use of the same aqueous composition and under the same conditions as those used in Example 3, a transparent golden yellow coating with metallic lustre was produced electrophoretically on said anode.

200 Chemically polished aluminum specimens (total surface area, 2 m²) of the same size as used above were electrophoretically coated in succession, without showing any variation in color, lustre and transparency throughout the whole operation.

EXAMPLE 5

An aluminum specimen similar to that used in Example 3 was subjected to a chemical conversion treatment (by use of "Allodine" trade-name of a product of Amchem Co.), to be used as the anode. Using the same aqueous composition and under the same conditions as used in Example 3, the electrophoretic coating operation was carried out, to produce a coating on said anode, which was identical in hue, value and chroma with that obtained in Example 3.

200 Aluminum specimens (total surface area, 2 m²) of the same size and treated in the same way as those used above, were electrophoretically coated in succession under the same conditions as above, without showing any variation in yellow color, lustre and transparency throughout the whole operation.

EXAMPLE 6

In a glass reactor provided with a stirrer, a thermometer, a reflux condenser, and a dropping funnel, 10 parts of trimethylated methylolmelamine and 5 parts of an aqueous solution containing 5 percent of soluble yellow chromogen-bonded polymer derived from anthraquinone were dissolved in 100 parts of isopropanol, and the solution was heated to 70° C. A mixture of 58 parts of ethyl acrylate, 12 parts of acrylonitrile, 10 parts of 2-hydroxy-propyl acrylate, 5 part of acrylic acid, and 5 parts of methacrylic acid, containing as an polymerization initiator 0.9 part of 2,2'-azobisisobutyronitrile, was added dropwise to said isopropanol solution over a period of about 6.5 hours. After the addition had been completed, the mixture was allowed to react for further 2 hours at 70° C. The reaction product was added with sufficient amount of ammonia to neutralize the carboxy groups contained in the polymer molecule, heated at the same temperature with stirring for further 30 min., and then 70 parts of isopropanol were removed for recovery by distillation under reduced pressure, followed by the addition of 70 parts of water to obtain a transparent yellow solution of the soluble copolymer. A 15 percent-aqueous solution of the copolymer, prepared by diluting with water, had a pH of 7.0 and a conductivity of $0.120 \times 10^4$ $\mu\mho$/cm at 20° C.

6 Liters of the 15 percent-aqueous solution obtained above were placed in a glass cell for electrodeposition-coating, similar to the one used in Example 1, provided with an anode of galvanized sheet iron and a cathode of stainless-steel sheet, each having an area of 100 cm² and placed 10 cm apart. A direct current was passed through the cell at a constant potential of 50 v. for 3 min., the initial current being 1.05 amp. and the total quantity 20.4 coulombs. A uniform yellow coating weighing 459.2 mg/dm² was obtained. After washing and baking at 150° C. for 30 min. in a hot air current, the coating was transparent yellow in color with metallic lustre, corresponding to the color specification of 7.5Y 9/8. The sward rocker value was 29, and the hardness corresponded to 3H grade of "Mitsubishi Uni" pencil. 200 Specimens (total area, 2 m²) of galvanized sheet iron of the same size were successively electrocoated in the same cell under the same conditions as those used above, to obtain the following results: initial current, 1.05 – 1.07 amp.; electricity, 20.4 – 21.3 coulombs; weight of coating, 459.2 – 470.3 mg/dm$^2$; color, the same as that obtained above in hue, value and chroma. It is clear from the results that there is substantially no variation among successive coatings.

The coated specimen was irradiated by ultra-violet rays for 200 hours in a color-fastness tester "Fademeter" made by Toya Rika instruments, Inc. without showing any change in hue, value and chroma. The corrosion resistance of the coated specimen was more than 500 hours in the salt spray test.

EXAMPLE 7

200 Parts of an aqueous solution, containing 2.5 percent of 2,4,6-tris{4'[p-(diazonium chloride)benzoylamino]-anthraquinonyl(-1')}-s-triazine and acidified with acetic acid, were mixed with 30 parts of water containing 3 parts of polyethylene glycol nonylphenyl ether. The mixture was added with 12 parts of maleic anhydride, 8 parts of ethyl acrylate, 1 part of n-dodecyl mercaptan, and 0.2 part of cuprous chloride, and subjected to polymerization reaction at 65° – 70° C. for 1.5 hours. The resultant chromogen-bonded polymer was filtered and washed, to obtain a paste. The paste was dispersed in conductivity water, brought into solution by the addition of triethylamine and methanol, and purified with an anion-exchange resin, to obtain an aqueous solution of a soluble colorant, red in color, the solid content of which was 6 percent.

A 5 percent-aqueous solution of said soluble chromogen-bonded polymer had a pH of 8.45 and a conductivity of 0.155 × 10$^4$ $\mu\sigma$/cm at 20° C.

66.7 Parts of isopropanol were heated to 70° C. in a glass reactor provided with a stirrer, a thermometer, and a reflux condenser. A mixture of 48 parts of isobutyl acrylate, 20 parts of styrene, 12 parts of 2-hydroxyethyl methacrylate, and 20 parts of acrylic acid, containing as a polymerization accelerator 3 parts of 2,2'-azobisisobutyro-nitrile, was added to said isopropanol in 10 portions in 45 min. After the addition had been finished, the mixture was allowed to react for further 3 hours at 70° – 80° C. to complete the polymerization. Then the reaction mixture was added with sufficient amount of triethanolamine to neutralize the acrylic acid contained in the resultant polymer molecule, heated at the same temperature with stirring for further 30 min., and then 24 parts of isopropanol were removed for recovery by distillation under reduced pressure, followed by the addition of 24 parts of purified water, to obtain a soluble vinyl copolymer.

A mixture of 80 parts of said copolymer and 20 parts of pentamethoxy-monobutoxymethylol melamine was dissolved in purified water to prepare a 15 percent-aqueous solution, having a pH of 8.07 and a conductivity of 0.142 × 10$^4$ $\mu$ /cm.

A mixture of 95 parts of said 15 percent-aqueous solution of soluble copolymer and 5 parts of a 5 percent-aqueous solution (pH, 8.45; conductivity, 0.155 × 10$^4$ $\mu\sigma$/cm) of the anthraquinone-based chromogen-bonded polymer obtained above, was placed in the same 6 l-cell as in Example 1 provided with a tin plate anode. A direct current was passed through the cell at a potential of 60 v. for 90 sec., the initial current being 0.35 amp. and the quantity of electricity passed being 7.6 coulombs, to produce on said anode an electrodeposited uniform coating, red in color and weighing 183.4 mg/dm$^2$. After baking at 170° C. for 30 min., the color of the coating corresponded to that of the standard color chip of 7.5 R (hue) 4 (value) / 10 (chroma) according to JIS Z-8721.

200 Tin plate specimens (total area, 2 m$^2$) of the same size were successively electrocoated in the same cell under the same conditions as those used above, to obtain the following results: initial current, 0.32 – 0.37 amp.; quantity of electricity, 7.3 – 7.7 coulombs; weight of coating, 172.5 – 183.7 mg/dm$^2$; color, 7.5 R 4/10. It is clear from the results that there was substantially no variation among successive coatings.

The coated specimens were irradiated by ultra-violet rays for 200 hours in a color-fastness tester ("Fademeter" made by Toyo Rika Instruments, Inc.) without showing any change in hue, value and chroma.

The physical properties of the coated specimen were as follows: sward rocker value (JIS K–5650), 28; pencil hardness ("Mitsubishi Uni" pencil), 3H – 4H; corrosion resistance (JIS Z–2371 salt spray test), >500 hours.

EXAMPLE 8

335 Parts of an aqueous solution containing 2.1 percent of 2-hydroxy-3-naphthoic anilide-3'-diazonium zinc chloride (double salt) were mixed with 8 parts of ethyl acrylate, 14 parts of acrylamide, 3 parts of maleic anhydride, and 7 parts of a 17 percent-aqueous solution of titanium trichloride, and subjected to polymerization reaction at 20° C. for 2 hours and at 50° C. for 3 hours. Then the pH of the reaction mixture was adjusted to 8 with caustic soda solution and the mixture was heated for further 2 hours. When cooled, a solution of diazotized 3-amino-4-methoxybenzanilide was added dropwise to the mixture to form a chromogen-bonded polymer by coupling reaction. In the same way as in Example 3, the resultant polymer was filtered, washed, dissolved, and purified resulting in an aqueous solution of soluble colorant, red in color.

Electrodeposition-coating was carried out in the same way as in Example 7 except that the colorant was substituted by the one obtained above, the produce coated specimens similar to those obtained in Example 7.

EXAMPLE 9

25 Parts of 4-(methacrylamide)-2,6-dichlorobenzene-azo-1-phenyl-3-methyl-5-pyrazolone, 25 parts of maleic anhydride, 15 parts of ethyl acrylate, 14 parts of acrylic acid, 1 part of N-methylol acrylamide, 320 parts of trichloroethylene, 130 parts of isopropanol, and 3.5 parts of 2,2'-azobisisobutyronitrile was charged in a polymerization reactor, to be subjected to polymerization reaction at 70° – 75° C. for 5 hours. After being dried, the resultant polymer was dissolved and purified in the same way as in Example 1, to obtain an aqueous solution of soluble yellow colorant.

Electrodeposition-coating was carried out in the same manner as in Example 3 except that the colorant was substituted by the one obtained above, to produce coated specimens similar to those obtained in Example 3.

EXAMPLE 10

1 Part of 2-hydroxy-3-naphthoic acid-(3'-methacrylamide)anilide, 1 part of polyethylene glycol nonylphenyl ether, 3 parts of ethyl acrylate, 2 parts of maleic anhydride, 1 part of methacrylic acid, and 0.2 part of potassium persulfate were added to 100 parts of water, and the mixture was subjected to polymerization reaction at 65° C. for 1 hour and 70° C. for further 2 hours. After the polymerization is completed, the pH of the resultant solution was adjusted to 9 with a 5 percent-aqueous solution of sodium carbonate, and added with diazotized 1-amino-anthraquinone to produce a chromogen-bonded polymer by coupling reaction. Then the polymer was filtered, washed, dissolved, and purified in the same manner as in Example 1, to produce an aqueous solution of a soluble red colorant.

Electrodeposition-coating was carried out in the same manner as in Example 7 except that the colorant was substituted by the one obtained above, to produce coated specimens similar to those obtained in Example 7.

EXAMPLE 11

50.9 Parts of Copper Phthalocyanine Blue in paste form (solid content, 39.3 percent), 8 parts of polyoxyethylene nonylphenyl ether (HLB, 14.2), and 41.1 parts of water were mixed with agitation and ground in "Speed Line Mill" (colloid mill) to produce an aqueous fine dispersion of blue pigment (solid content, 39.8 percent; pH, 7.7; conductivity, 0.129 × $10^4$ μʊ/cm).

On the other hand, 100 parts of isopropanol were heated to 70° C. in a glass reactor provided with a stirrer, a thermometer, a reflux condenser, and a dropping funnel. A mixture of 59 parts of acrylic acid, 21 parts of methyl methacrylate, 12 parts of N-methylol acrylamide, and 8 parts of acrylic acid, containing as a polymerization initiator 1 part of 2,2'-azobisisobutyronitrile were added to said isopropanol dropwise over a period of about 6.5 hours. After completion of the addition, the mixture was allowed to react at 70° C. for further 2 hours, to complete polymerization. Then the mixture was added with sufficient amount of triethylamine to neutralize the acrylic acid in the resultant polymer molecule, and stirred for further 30 min. at the same temperature, to produce a soluble vinyl copolymer. An aqueous solution containing 12 percent of the copolymer showed a pH value of 8.01 and a conductivity of 0.148 × $10^4$ μʊ/cm. 100 Parts of a 15 percent-aqueous solution of said copolymer and 0.4 part of the aqueous dispersion of pigment described above were mixed to form a colored aqueous composition for electrocoating, which was introduced into a 1 $l$-glass cell for electrocoating provided with an aluminum anode plate, 4 × 10 cm² in area, and a stainless-steel cathode plate, 5 × 10 cm² in area, each plate being held in position parallel to each other 5.5 cm apart. While being stirred with a magnetic stirrer, through the aqueous composition was passed a direct current for 2 min. At a constant electrode potential of 40 v., the initial current being 0.30 amp. A uniform blue electro-coating was produced on the anode. After being washed and baked at 170° C. for 30 min. in a hot air oven, the aluminum plate was found to be coated with a fine and durable film having uniform thickness and transparent blue color.

Colored electrodeposition-coated aluminum plates similar to that obtained above were also produced by use of the aqueous fine dispersions prepared from the pigments shown in the following table.

| | Aqueous fine dispersion | | | | | |
|---|---|---|---|---|---|---|
| Pigment used in dispersion | surface-active agent*, part | water, part | solid % | pH | conductivity, μʊ/cm | Amount added per 100 parts of 15% copolymer solution, part |
| 30 parts of tetrachloro-copper-phthalocyanine | 8 | 62 | 38.5 | 6.8 | 0.55 × $10^3$ | 0.5 |
| 30 parts of copper phthalocyanine Green | 8 | 62 | 38.0 | 4.65 | 0.37 × $10^4$ | 0.5 |

*Polyoxyethylene nonylphenyl ether (HLB, 14.2)

The coated specimens were irradiated by ultra-violet rays in a color-fastness tester ("Fademeter" made by Toyo Rika Instruments, Inc.) for 1000 hours without any change in hue, value and chroma of their color.

EXAMPLE 12

5 Parts of ethyl acrylate, 4 parts of maleic anhydride, 1 part of acrylic acid, 2 parts of acrylamide, and 1 part of polyethylene glycol nonylphenyl ether were mixed with 87 parts of water with agitation to form an emulsion of monomers. The emulsion was added with 77 parts of an aqueous solution containing 3 percent of copper phthalocyanine blue tri-diazonium-chloride, then its temperature was brought up to 57° C. in 1.5 hours, and stirred at this temperature for further 1.5 hours, to complete the polymerization. The resultant chromogen-bonded polymer was filtered and washed, to obtain a paste. The paste was dispersed in conductivity water, neutralized with triethanolamine, and purified with an anion-exchange resin, to produce an aqueous solution of soluble blue colorant, containing 10 percent of solid. A 5 percent-aqueous solution of said soluble colorant, i.e., a soluble blue chromogen-bonded polymer, had a pH of 8.33 and a conductivity of 0.150 × $10^4$ μʊ/cm.

On the other hand, 50.9 parts of Copper Phthalocyanine Blue in paste form (solid content, 39.3 percent) and 8 parts of polyoxyethylene nonylphenyl ether (HLB, 14.2) were mixed with 41.1 parts of water with agitation and ground in "Speed Line Mill", to form an aqueous fine dispersion of blue pigment (solid content, 39.8 percent; pH, 7.7; conductivity, 0.129 × $10^4$ μʊ/cm).

0.3 Part of said dispersion of pigment and 3 parts of above-mentioned soluble chromogen-bonded polymer were mixed with 100 parts of the same 15 percent-aqueous solution of vinyl copolymer as that used in Example 11, to form a colored aqueous composition for electrodeposition-coating. By use of said aqueous composition and the same aluminum anode plate and under the same conditions as those in Example 11, electrocoating was carried out, to produce a uniform blue coating on said aluminum anode, the initial current being 0.38 amp. After being washed and baked at 170° C. for 30 min. in a hot air oven, the aluminum plate was found to be coated with a colored film having excellent lustre, transparency, and a noble appearance.

Similar results were obtained with aqueous dispersions based on the pigments shown in the following table:

| | | Aqueous fine dispersion of pigment | | | Amount added per 100 parts of 15%-copolymer soln., part | |
|---|---|---|---|---|---|---|
| Pigment used in dispersion | surface-active agent*, part | water, part | solid % | pH | conductivity, μʊ/cm | ag. fine dispersion, part of pigment | 5%-soln. of chromogen-bonded polymer, part |
| 30 parts of tetrachloro-copper phthalocyanine | 8 | 62 | 38.5 | 6.8 | 0.55 × $10^3$ | 0.3 | 3 |
| 30 parts of copper phthalocyanine green | 8 | 62 | 38.5 | 4.65 | 0.37 × $10^4$ | 0.3 | 3 |

*Polyoxyethylene nonylphenyl ether (HLB, 14.2)

The coated specimens were irradiated by ultra-violet rays in a color-fastness tester ("Fedemeter" made by Toyo Rika Instruments, Inc.) for 1000 hours without any change in hue, value and chroma of their color.

EXAMPLE 13

30 Parts of N,N'-bis(3', 5'-dimethylphenyl)perylene-3,4,9,10-dicarboimide, 8 parts of polyoxyethylene nonylphenyl ether (HLB, 14.2), and 62 parts of water were mixed with agitation and ground in a "Speed Line Mill", to obtain an aqueous fine dispersion of red pigment (solid content, 38.4 percent; pH, 7.25; conductivity, 0.493 × $10^3$ μʊ/cm). 100 Parts of the soluble vinyl copolymer prepared by neutralizing with triethylamine a copolymer consisting of 59 parts of butyl acrylate, 21 parts of methyl methacrylate, 12 parts of N-methylol acrylamide, and 8 parts of acrylic acid, i.e., the same as that used in Example 11, were mixed with 20 parts of hexamethoxymethylol melamine, and dissolved in conductivity water to form a 15 percent-aqueous solution, having a pH of 7.90 and a conductivity of 0.142 × $10^4$ μʊ/cm.

100 Parts of said 15 percent-aqueous solution were mixed with 0.5 part of above-mentioned aqueous dispersion of red pigment, to produce an aqueous composition. Using said aqueous composition and an anode of galvanized sheet iron, 4 × 10 cm² in area, electrodeposition-coating was carried out, as in Example 11, by passing a direct current for 2 min. through the composition at a potential of 40 v., to produce a red coating, uniform in thickness, on said anode. After being baked, as in Example 11, the sheet iron specimen was found to be coated with fine and durable film, red in color with transparent look.

Similar results were obtained with aqueous dispersions based on other pigments shown in the following table:

| Pigment used in dispersion | Aqueous fine dispersion | | | | | Amount added per 100 parts of 15%-copolymer solution, part |
|---|---|---|---|---|---|---|
| | surface-active agent*, part | water, part | said % | pH | conductivity, $\mu \mho$/cm | |
| 25 parts of bis [2''-methoxycarbonyl)-phenyl-azo-2''-hydroxy-3''-naphthoic acid]-benzodide | 8 | 67 | 27.8 | 7.2 | 0.49 × 10³ | 0.5 |
| 25 parts of 2,9-dimethyl-quinacridone | 8 | 67 | 28.0 | 8.0 | 0.492 × 10³ | 1.0 |

*Polyoxyethylene nonylphenyl ether (HLB, 14.2)

The coated specimens were irradiated by ultra-violet rays in a color-fastness tester ("Fademeter" made by Toyo Rika Instruments, Inc.) for 1000 hours without any change in hue, value and chroma of their color.

EXAMPLE 14

200 Parts of an aqueous solution, containing 2.5 percent of 2,4,6-tris{4'-[p-(diazonium chloride)benzoylamino]-anthraquinonylamino (-1')}-s-triazine and acidified with acetic acid, were mixed with 30 parts of water containing 3 parts of polyethylene glycol nonylphenyl ether. The mixture was added with 12 parts of maleic anhydride, 8 parts of ethyl acrylate, 1 part of n-dodecyl mercaptane, and 0.2 part of cuprous chloride, and subjected to polymerization reaction at 65° – 70° C. for 1.5 hours. The resultant chromogen-bonded polymer was filtered and washed, to obtain a paste. The paste was dispersed in conductivity water, brought into solution by the addition of triethylamine and methanol, and purified with an anion-exchange resin, to obtain an aqueous solution of a soluble red colorant, the solid content of which was 6%.

A 5 percent-aqueous solution of said chromogen-bonded polymer had a pH of 8.45 and a conductivity of 0.155 × 10⁴ $\mu \mho$/cm at 20° C.

On the other hand, 30 parts of N,N'-bis(3', 5'-dimethylphenyl)perylene-3,4,9,10-dicarboimide, 8 parts of polyoxyethylene nonylphenyl ether (HLB, 14.2), and 62 parts of water were mixed with agitation and ground in "Speed Line Mill", to obtain an aqueous fine dispersion of red pigment.

66.7 Parts of isopropanol were heated to 70° C. in a glass reactor provided with a stirrer, a thermometer, and a reflux condenser. A mixture of 48 parts of isobutyl acrylate, 20 parts of styrene, 12 parts of 2-hydroxyethyl methacrylate, and 20 parts of acrylic acid, containing as a polymerization accelerator 3 parts of 2,2'-azobisiso-butyronitrile, was added in 10 portions. In 45 min. after the addition had been finished, the mixture was allowed to react for further 3 hours at 70° – 80° C. to complete the polymerization. Then the reaction mixture was added with sufficient amount of triethanolamine to neutralize the acrylic acid in the resultant polymer molecule, heated at the same temperature with stirring for further 30 min., and then 24 parts of isopropanol were removed for recovery by distillation under reduced pressure, followed by the addition of 24 parts of purified water, to obtain a soluble vinyl copolymer.

A mixture of 80 parts of said copolymer and 20 parts of pentamethoxy-monobutoxymethylol melamine was dissolved in purified water to prepare a 15 percent-aqueous solution, having a pH of 8.07 and a conductivity of 0.142 × 10⁴ $\mu \mho$/cm.

100 Parts of said 15 percent-aqueous solution of copolymer, 4 parts of above-mentioned soluble chromogen-bonded polymer, and 0.4 part of above-mentioned aqueous dispersion of red pigment were mixed to form an aqueous composition for electrodeposition-coating. By use of said aqueous composition and the same aluminum anode plate and under the same conditions as in Example 11, electrodeposition-coating was carried out, to produce a uniform red coating on said aluminum anode, the initial current being 0.37 amp. After being washed and baked at 170° C. for 30 min. in a hot air oven, the aluminum specimen was found to be coated with a film, uniform in thickness, having excellent lustre and transparency with noble appearance.

Using an anode of tin plate in the same cell and under the same conditions as above, electrodeposition-coating was conducted, the initial current being 0.36 amp. After being baked the tin plate was found to be coated with a film having the same characteristics as above.

The colored electrodeposition-coatings obtained above were irradiated by ultra-violet rays in a color-fastness tester ("Fademeter" made by Toyo Rika Instruments, Inc.) for 1000 hours without showing any change in hue, value and chroma of their color.

Similar results were obtained with aqueous dispersions based on other pigments shown in the following table:

| Pigment used in dispersion | Aqueous fine dispersion of pigment | | | | | Amount added per 100 parts of 15%-copolymer soln., part | |
|---|---|---|---|---|---|---|---|
| | surface-active agent*, part | water, part | solid % | pH | conductivity, $\mu \mho$/cm | aqueous 5%-soln. fine dispersion, part of pigment | of chromogen-bonded polymer, part |
| 25 parts of bis [2''-methoxycarbonyl)-phenyl-azo-2'-hydroxy-3'-naphthoic acid]benzidide | 8 | 67 | 27.8 | 7.2 | 0.49 × 10³ | 0.5 | 3 |
| 25 parts of 2,9-dimethyl-quinacrydone | 8 | 67 | 28.0 | 8.0 | 0.492 × 10³ | 0.2 | 6 |

*Polyoxyethylene nonylphenyl ether (HLB, 14.2)

The coated specimens were irradiated by ultra-violet rays in a color-fastness tester ("Fademeter" made by Toyo Rika Instruments, Inc.) for 1000 hours without any change in hue, value and chroma of their color.

EXAMPLE 15

25 Parts of bis[4'-(2''-methyl-5''-chlorophenyl-azo-acetoacetamide)-3'-chlorobenzoyl]-2,5-dimethylphenylen-1,4-diamide, 8 parts of polyoxyethylene nonylphenyl ether (HLB, 14.2), and 67 parts of water were mixed and ground in "Speed Line Mill", to obtain an aqueous fine dispersion of yellow pigment (solid content, 28.2 percent; pH, 8.0; conductivity, 0.442 × 10³ $\mu \mho$/cm). 66.7 Parts of isopropanol were heated to 70° C. in a glass reactor provided with a stirrer, a thermometer, and a reflux condenser. A mixture of 65 parts of isobutyl acrylate, 15 parts of methyl methacrylate, 12 parts of 2-hydroxyethyl methacrylate, and 8 parts of acrylic acid, containing as a polymerization initiator 1 part of 2,2'-azobisisobutyronitrile, was added in 10 portions in 45 min. to said isopropanol. After the addition had been finished, the mixture was allowed to react for further 3 hours at 70° – 76° C. to complete the polymerization. Then the mixture was added with sufficient amount of dimethylethanol-amine to neutralize the acrylic acid in the resultant polymer molecule, heated at the same temperature with stirring for further 30 min., to obtain a soluble vinyl copolymer. A mixture of 70 parts of said copolymer and 30 parts of pentamethoxy-monobutoxymethylol melamine was dissolved in conductivity water to prepare a 12 percent-aqueous solution, having a pH of 7.85 and a conductivity of $0.177 \times 10^4$ μʊ/cm at 20° C.

100 Parts of said 12 percent-aqueous solution of soluble copolymer were mixed with 5 parts of above-mentioned aqueous fine dispersion of yellow pigment to form an aqueous composition for electrodeposition-coating. In the same cell as that used in Example 11, a direct current was passed through said aqueous composition for 2 min. at a potential of 40 v., the initial current being 0.31 amp. A uniform yellow electrodeposition-coating was produced on the anode.

After being baked at 200° C. for 15 min., the coating was durable and transparent yellow in color.

Similar coatings were obtained with aqueous fine dispersions of other pigments shown in the following table:

| Pigment used in dispersion | Aqueous fine dispersion | | | | | Amount added per 100 parts of 12%-copolymer soln., part |
|---|---|---|---|---|---|---|
| | surface-active agent*, part | water, part | solid % | pH | conductivity, μʊ/cm | |
| 30 parts of Flavanthrone yellow | 8 | 62 | 33.0 | 7.4 | $0.470 \times 10^3$ | 10 |
| 25 parts of 3,3'-dichlorophenyl-4,4'-bis[acetoaceto-(2,5-dimethoxydichloro)]-anilide | 6 | 69 | 28.9 | 7.0 | $0.441 \times 10^3$ | 10 |

*Polyoxyethylene nonylphenyl ether (HLB, 14.2)

The coated specimens were irradiated by ultra-violet rays in a color-fastness tester ("Fademeter" made by Toyo Rika Instruments, Inc.) for 1000 hours without any change in hue, value and chroma of their color.

EXAMPLE 16

12 Parts of ethyl acrylate, 1.8 parts of acrylic acid, 3 parts of maleic anhydride, 0.6 part of n-dodecyl mercaptan, 9 parts of sodium hypophosphite monohydrate, and 18 parts of water were added to 54 parts of an aqueous dispersion containing 7.3 percent of 2,4,6-tris[4'-(diazonium-dodecylbenzene sulfonate)-anthraquinonylamino(-1')]-s-triazine, and the mixture was heated to 70° C. in one hour, and then subjected to polymerization reaction for further 2 hours. The resultant chromogen-bonded polymer was filtered and washed to obtain a paste, which was subsequently dispersed in water, brought into solution by addition of triethylamine and methanol, and purified with an anion-exchange resin, to obtain an aqueous solution of soluble yellowish brown colorant. A 5 percent-aqueous solution of said soluble chromogen-bonded polymer showed a pH of 8.7, and a conductivity of $0.187 \times 10^4$ μʊ/cm at 20° C.

25 Parts of bis [4'-(2''-methyl-5''-chlorophenyl-azoacetoacetamido)-3'-chlorobenzoyl]-2,5-dimethylphenylene-1,4-diamide were mixed with agitation with 67 parts of water containing 8 parts of polyoxyethylene nonylphenyl ether (HLB, 14.2), and the mixture was ground in "Speed Line Mill", to produce an aqueous fine dispersion of yellow pigment (solid content, 28.2 percent; pH, 8.0; conductivity, $0.442 \times 10^3$ μʊ/cm).

On the other hand, 100 parts of isopropanol were heated to 70° C. in a glass reactor provided with a stirrer, a thermometer, a reflux condenser, and a dropping funnel. A mixture of 59 parts of butyl acrylate, 21 parts of methyl methacrylate, 12 parts of N-methylol acrylamide, and 8 parts of acrylic acid, containing as a polymerization initiator 1 part of 2,2'-azobisisobutyronitrile, was added dropwise to said isopropanol maintained at 70° C. during a period of about 6.5 hours. After the addition has been finished, the mixture was kept at 70° C. for further 2 hours to complete the polymerization reaction. Then the reaction mixture was added with sufficient amount of triethylamine to neutralize the acrylic acid in the resultant polymer molecule, and was stirred for further 30 min. at the same temperature, to produce a soluble vinyl copolymer. A 15 percent-aqueous solution of the copolymer showed a pH of 8.01 and a conductivity of $0.148 \times 10^4$ μʊ/cm at 20° C.

100 Parts of said 15%-aqueous solution of copolymer, 2 parts of above-mentioned soluble chromogen-bonded polymer, and 0.2 part of above-mentioned aqueous dispersion of yellow pigment were mixed to form an aqueous composition for electrodeposition-coating. The composition was introduced into a 1 l-glass cell for electrodeposition-coating provided with an aluminum anode plate, 80 cm² in area, and a stainless-steel cathode plate, 100 cm² in area, each plate being held in position parallel to each other 5.5 cm apart. A direct current was passed through the aqueous composition, while being stirred with a magnetic stirrer, for 2 min. at a constant potential of 40 v., the initial current being 0.36 amp. A uniform yellow electro-deposition-coating was produced on the aluminum anode. After being washed and baked at 170° C. for 30 min. in a hot air oven, the aluminum plate was found to be coated with a film, uniform in thickness, having a characteristic excellent lustre and transparency.

Electrodeposition-coated aluminum plates similar to that obtained above were also produced by the use of the aqueous compositions comprising above-mentioned soluble yellowish brown chromogen-bonded polymer and the aqueous fine dispersion of pigments shown in the following table.

| Pigment used in dispersion | Aqueous fine dispersion of pigment | | | | | Amount added per 100 parts of 15%-copolymer soln., part | |
|---|---|---|---|---|---|---|---|
| | surface-active agent*, part | water part | solid % | pH | conductivity μʊ/cm | aqueous fine dispersion, part of pigment | 5% soln. of chromogen-bonded polymer, part |
| 30 parts of flavanthrone Yellow | 8 | 62 | 33.0 | 7.4 | $0.47 \times 10^3$ | 0.4 | 6 |
| 25 parts of 3,3'-dichloro-diphenyl-4,4'-bis [acetoaceto-(2,5-dimethoxy-4-chloro)] oxy-4-chloro)]-anilide | 6 | 69 | 28.9 | 7.0 | $0.441 \times 10^3$ | 0.2 | 8 |

*Polyoxyethylene nonylphenyl ether (HLB, 14.2)

The coated specimens were irradiated by ultra-violet rays in a color-fastness tester ("Fademeter" made by Toyo Rika Instruments, Inc.) for 1000 hours without any change in hue, value and chroma of their color.

EXAMPLE 17

In a glass reactor provided with a stirrer, a thermometer, a reflux condenser, and a dropping funnel, 10 parts of trimethylated methylol melamine and 5 parts of a 5 percent-aqueous solution of the yellow anthraquinone-based chromogen-bonded polymer, used in Example 16, were dissolved in 100 parts of isopropanol, and heated to 70° C. A mixture of 58 parts of ethyl acrylate, 12 parts of acrylonitrile, 10 parts of 2-hydroxypropyl acrylate, 5 parts of acrylic acid, and 5 parts of methacrylic acid, containing 0.9 part of 2,2'-azobisisobutyronitrile as a polymerization initiator, was added dropwise to said isopropanol solution during a period of about 6.5 hours. After completion of the addition, the mixture was allowed to react for further 2 hours at 70° C. Then the reaction mixture was added with sufficient amount of ammonia water to neutralize the carboxyl group of the resultant polymer molecule, heated at the same temperature for further 30 min. while being stirred, and then 70 parts of isopropanol were removed for recovery by distillation under reduced pressure, followed by the addition of 70 parts of conductivity water, to obtain a soluble vinyl copolymer which was a transparent yellow product. A 15 percent-aqueous solution of said vinyl copolymer showed a pH of 7.0 and a conductivity of $0.120 \times 10^4 \mu\mho$/cm at 20° C.

50 Parts of Chrome Yellow, 5 parts of a condensation product of sodium naphthalenesulfonate with formalin, and 45 parts of water were mixed with agitation, and ground in "Speed Line Mill", to prepare an aqueous fine dispersion of yellow pigment (solid content, 53.3 percent; pH 7.2; conductivity, $0.545 \times 10^4 \mu\mho$/cm).

2.0 Parts of said dispersion of yellow pigment were mixed with above-mentioned 15 percent-aqueous solution of soluble copolymer were mixed to form an aqueous composition for electrodeposition-coating. By use of said aqueous composition and an anode prepared from the same aluminum plate as that used in Example 11 by well-known chemical polishing treatment, the electrophoretic coating operation was carried out under the same conditions as those in Example 11, to produce a transparent golden-yellow coating with metallic lustre on said aluminum plate, the initial current being 0.33 amp.

The coated specimens were irradiated by ultra-violet rays in a color-fastness tester ("Fademeter" made by Toyo Rika Instruments, Inc.) for 1000 hours without any change in hue, value and chroma of their color.

EXAMPLE 18

30 Parts of "MB Carbon 0100" (Trade-Mark), 9 parts of polyoxyethylene nonylphenyl ether, and 61 parts of water were mixed with agitation, and ground in "Speed Line Mill," to produce an aqueous fine dispersion of black pigment (solid content, 36.3 percent; pH, 5,8; conductivity, $0.341 \times 10^3 \mu\mho$/cm).

100 Parts of the same soluble vinyl copolymer and 0.4 part of the same aqueous fine dispersion of red pigment as those used in Example 13, and 0.1 part of the above-mentioned aqueous fine dispersion of black pigment were mixed to form an aqueous composition for electrodeposition-coating. By use of said composition and the same aluminum plate anode as that used in Example 11, a direct current was passed through the composition for 2 min. at a constant potential of 40 v. in a way similar to that in Example 11, the initial current being 0.32 amp. A blackish red coating, uniform in thickness, was produced on said aluminum anode. After being backed in a way similar to that in Example 11, the aluminum plate was found to be coated with a colored durable film with transparency and fine noble look.

The coated specimens were irradiated by ultra-violet rays in a color-fastness tester ("Fademeter" made by Toyo Rika Instruments, Inc.) for 1000 hours without any change in hue, value and chroma of their color.

EXAMPLE 19

100 Parts of the same soluble vinyl copolymer as used in Example 11 were mixed with 0.4 part of the same aqueous fine dispersion of blue pigment as used in Example 11, 0.4 part of the same aqueous fine dispersion of red pigment as used in Example 13, and 0.2 part of the same aqueous fine dispersion of black pigment, to form an aqueous composition for electrodeposition-coating. By use of said composition and the same aluminum plate anode as that used in Example 11, a direct current was passed through the composition for 2 min. at a constant potential of 40 v. in a way similar to that in Example 11, the initial current being 0.32 amp. An electrodeposited coating, uniform in thickness, was produced on said aluminum anode. After being baked in a way similar to that in Example 11, the aluminum plate was found to be coated with a blackish purple film with transparency and a noble look.

The coated specimens were irradiated by ultra-violet rays in a color-fastness tester ("Fademeter" made by Toyo Rika Instruments, Inc.) for 1000 hours without any change in hue, value and chroma of their color.

EXAMPLE 20

50 Parts of Chrome Yellow, 5 parts of sodium naphthalenesulfonate-formaldehyde condensation product, and 45 parts of water were mixed with agitation and ground in "Speed Line Mill" to prepare an aqueous fine dispersion of yellow pigment (Solid content, 53.5 percent; pH, 7.2; conductivity, $0.545 \times 10^4 \mu\mho$/cm).

3.0 Parts of said aqueous fine dispersion were mixed with 100 parts of the same soluble vinyl copolymer as that used in Example 13, to form an aqueous composition for electrodeposition-coating. By use of said composition and the same aluminum plate anode as that used in Example 11, a direct current was passed through the composition for 2 min. at a constant potential of 60 v., the initial current being 0.71 amp. An electrodeposited yellow coating, uniform in thickness, was produced on said aluminum anode. After being baked in a way similar to that in Example 11, the aluminum plate was found to be coated with a fine and durable film with transparency.

The coated specimen was irradiated by ultra-violet rays in a color-fastness tester ("Fademeter" made by Toyo Rika Instruments, Inc.) for 1000 hours without any change in hue, value and chroma of its color.

EXAMPLE 21

By use of the same aqueous composition as in Example 15 and an anode prepared from the same aluminum plate as that used in Example 11 by well-known chemical polishing treatment, the electrophoretic coating operation was carried out under the same conditions as those in Example 11, to produce a transparent golden-yellow coating with metallic lustre on said aluminum plate. The coated aluminum plate was irradiated by ultra-violet rays in a color-fastness tester ("Fademeter" made by Toyo Rika Instruments, Inc.) for 1000 hours without any change in hue, value and chroma of its color.

EXAMPLE 22

By use of the same aqueous composition as in Example 15 and an anode prepared from the same aluminum plate as that used in Example 11 by a chemical conversion treatment ('-'Alodine 1000," trade-name, Amchem Co.), the electrophoretic coating operation was carried out under conditions similar to those in Example 11, to produce on said anode a coating similar to that in Example 15 in hue, value and chroma of its color. The coated aluminum plate was irradiated by ultra-violet rays in a color-fastness tester ("Fademeter" made by Toyo Rika Instruments, Inc.) for 1000 hours without any change in hue, value and chroma of its color.

What is claimed is:

1. An electrodeposition-color-coating composition which comprises (A) a water-soluble vinyl copolymer, which will deposit on the anode, containing as the essential constitutional elements of the copolymer 95 to 70 percent by weight of at least one α,β-ethylenically unsaturated monomer having the general lower alkyl group, X is —COOR', —CONH₂ or methylol- or alkoxymethyl- derivative thereof, —OCOR", —CN, or

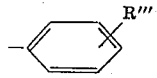

and wherein R' is an alkyl or hydroxyalkyl group of less than 9 carbon atoms, R" is a lower alkyl group and R'" is a hydrogen atom or a lower alkyl group, and 5 to 30 percent by weight as carboxylic acid of an ammonium salt or amine salt of at least one α,β-ethylenically unsaturated carboxylic acid, and (B) at least one member selected from the group consisting of (1) an ammonium- or amine-salt of a chromogen-bonded polymer obtained by reacting (a) a chromogen having diazonium group or α,β-ethylenically unsaturated group with (b) an α,β-ethylenically unsaturated carboxylic acid or a mixture of an α,β-ethylenically unsaturated carboxylic acid and other α,β-ethylenically unsaturated monomer, (2) an ammonium- or amine-salt of a chromogen-bonded polymer prepared by reacting (a') a chromogen intermediate having a diazonium group or α,β-ethylenically unsaturated group, with the above-mentioned component (b) and subsequently subjecting the reaction product to development and (3) an aqueous dispersion of pigment prepared by dispersing a pigment in water with a nonionic or anionic surface active agent.

2. A composition according to claim 1, wherein the content of the total solid matter in the composition is 10 to 20 percent by weight based on the weight of the composition.

3. A composition according to claim 1, wherein said composition contains less than 5 parts of an organic pigment per 100 parts by weight of the soluble vinyl copolymer.

4. A composition according to claim 1, wherein said composition contains less than 50 parts by weight of an inorganic pigment per 100 parts by weight of the soluble vinyl copolymer.

5. A composition according to claim 1, wherein said composition contains a water-soluble aminoplast resin comprising etherified methylol melamine in which two or more methyl groups are etherified with a lower aliphatic alcohol.

6. A composition according to claim 5, wherein the content of the etherified methylol melamine is 10 to 30 percent by weight based on the weight of the soluble vinyl copolymer.

7. A composition according to claim 1, wherein the chromogen (a) is a compound selected from the group consisting of the compounds of phthalocyanine group, anthraquinone group, perinone group, perylene group, indigo group, thioindigo group, dioxazine group, quinacridone group, azo-coupling group, poly-azo group; and aniline black.

8. A composition according to claim 1, wherein the chromogen intermediate (a') is a compound selected from the group consisting of phenols, naphthols, hydroxynaphthoic arylamides, phenylpyrazolones, and acetoacetoacrylamides.

9. A composition according to claim 1, wherein the chromogen-bonded polymer contains 1 to 50 percent by weight of chromogen chemically bonded thereto.

10. A composition according to claim 1, wherein the α,β-ethylenically unsaturated carboxylic acid (b) is at least one member selected from the group consisting of acrylic acid, methacrylic acid, crotonic acid, itaconic acid, maleic acid, fumaric acid, acid halides of these acids, and acid anhydrides of these acids.

11. A composition according to claim 1, wherein the α,β-ethylenically unsaturated monomer (b) is at least one monomer selected from the group consisting of N-methylol acrylamide, N-methylol methacrylamide, alkoxymethyl derivatives of these amides, glycidyl methacrylate, acrylamide, methacrylamide, 2-hydroxyethyl methacrylate, hydroxypropyl methacrylate, C₁₋₈-alkyl acrylate, C₁₋₈-alkyl methacrylate, vinyl esters of C₁₋₈-alkylcarboxylic acids, styrene, acrylonitrile, and methacrylonitrile.

12. A composition according to claim 1, wherein the pigment of the aqueous dispersion (3) is a pigment selected from the group consisting of pigments of the phthalocyanine group, anthraquinone group, perinone group, perylene group, indigo group, thioindigo group, dioxazine group, quinacridone group, azo-coupling group, and poly-azo group; carbon black; and aniline black.

13. A composition according to claim 1, wherein the pigment of the aqueous dispersion (3) is a pigment selected from the group consisting of titanium dioxide, chrome yellow, molybdate red, red iron oxide, yellow ochre, ultramarine, chromium oxide green, cadmium yellow, cadmium red, cobalt blue, clay, calcium carbonate, and barium sulfate.

14. A composition according to claim 1, wherein the surface active agent in the component (3) is at least one member selected from the group consisting of alkali metal salts, ammonium salts, and amine salts of aliphatic carboxylic acids, alkyl esters of sulfuric acid, sulfate oils, alkylsulfonic acids, arylsulfonic acids, and alkylarylsulfonic acids.

15. A composition according to claim 1, wherein the surface active agent in the component (3) is at least one member selected from the group consisting of polyethylene glycol alkyl esters, polyethylene glycol alkyl ethers, polyethylene glycol alkylphenyl ethers, polyethylene glycol alkylamides, and fatty acid esters of sorbitans.

16. A composition according to claim 1, wherein the α,β-ethylenically unsaturated monomer which is one of the constitutional elements of the soluble vinyl copolymer (A) is at least one member selected from the group consisting of ethyl-, n-propyl-, isopropyl-, n-butyl-, isobutyl- acrylates and - methacrylates, methyl methacrylate, styrene, and acrylonitrile.

17. A composition according to claim 1, wherein the soluble vinyl copolymer (A) contains as one of constitutional elements 5 to 30 percent by weight of at least one monomer selected from the group consisting of hydroxyalkyl acrylates, hydroxyalkyl methacrylates, hydroxyalkyl acrylamides, hydroxyalkyl methacrylamides, alkoxymethyl acrylamides, alkoxymethylmethacrylamides, acrylamide, and methacrylamide.

18. A composition according to claim 1, wherein the α,β-ethylenically unsaturated carboxylic acid which is one of the constitutional elements of the soluble vinyl copolymer (A) is at least one member selected from the group consisting of acrylic acid, methacrylic acid, and maleic acid.

19. A composition according to claim 1, which comprises the aqueous solution of amine salt of the chromogen-bonded polymer prepared by reacting copper phthalocyanine blue-tri-diazonium chloride with ethyl acrylate, maleic anhydride, acrylic acid, and acrylamide; and the aqueous solution of amine salt of the copolymer of butyl acrylate, methyl methacrylate, N-methylol acrylamide, and acrylic acid.

20. A composition according to claim 1, which comprises the aqueous solution of amine salt of the chromogen-bonded polymer prepared by reacting copper phthalocyanine blue-tri-diazonium chloride with ethyl acrylate, maleic anhydride, acrylic acid, and acrylamide; the aqueous solution of amine salt of the copolymer of butyl acrylate, methyl methacrylate, N-methylol acrylamide, and acrylic acid; and hexamethoxymethylol melamine.

21. A composition according to claim 1, which comprises an aqueous solution of amine salt of the chromogen-bonded polymer prepared by reacting 2,4,6-tris-[4'-(diazonium-dodecylbenzene sulfonate) anthraquinonylamino(-1')]-s-triazine with ethyl acrylate, acrylic acid, and maleic anhydride; an aqueous solution of amine salt of the copolymer of isobutyl acrylate, methyl methacrylate, 2-hydroxyethyl methacrylate, and acrylic acid; and pentamethoxy-monobutoxy methylol melamine.

22. A composition according to claim 1, which comprises an aqueous solution of amine salt of the chromogen-bonded polymer prepared by reacting 2,4,6-tris[4'-(diazonium-dodecylbenzenesulfonate)anthraquinonylamino(-1')]-s-triazine with ethyl acrylate, acrylic acid, and maleic anhydride; and an aqueous solution of ammonium salt of the copolymer prepared by polymerizing ethyl acrylate, acrylonitrile, 2-hydroxypropyl acrylate, acrylic acid, and methacrylic acid in the presence of trimethylated methylol melamine.

23. A composition according to claim 1, which comprises an aqueous solution of amine salt of the chromogen-bonded polymer prepared by reacting 2,4,6-tris{4'-[p-(diazonium chloride)benzoylamino]-anthraquinonyl(-1')}-s-triazine with maleic anhydride and ethyl acrylate; an aqueous solution of amine salt of the copolymer of isobutyl acrylate, styrene, 2-hydroxyethyl methacrylate, and acrylic acid; and pentamethoxymonobutoxy methylol melamine.

24. A composition according to claim 1, which comprises an aqueous solution of amine salt of the chromogen-bonded polymer prepared by coupling the polymer-bonded coupler obtained by reacting 2-hydroxy-3-naphthoic anilide-3'-diazonium zinc chloride double salt with ethyl acrylate, acrylamide, and maleic anhydride, with diazotized 3-amino-4-methoxybenzanilide; an aqueous solution of amine salt of the copolymer of isobutyl acrylate, styrene, 2-hydroxyethyl methacrylate, and acrylic acid; and pentamethoxy-monobutoxy methylol melamine.

25. A composition according to claim 1, which comprises an aqueous solution of amine salt of the chromogen-bonded polymer prepared by reacting 4-(methacrylamido)-2,6-dichlorobenzene-azo-1-phenyl-3-methyl-5-pyrazolone; an aqueous solution of amine salt of the copolymer of isobutyl acrylate, methyl methacrylate, 2-hydroxyethyl methacrylate, and acrylic acid; and pentamethoxy-monobutoxy methylol melamine.

26. A composition according to claim 1, which comprises an aqueous solution of amine salt of the chromogen-bonded polymer prepared by coupling the polymer-bonded coupler obtained by reacting 2-hydroxy-3-naphthoic-(3'-methacrylamido)anilide with ethyl acrylate, maleic anhydride, and methacrylic acid with diazotized 1-amino-anthraquinone; an aqueous solution of amine salt of the copolymer of isobutyl acrylate, styrene, 2-hydroxyethyl methacrylate, and acrylic acid; and pentamethoxy-monobutoxymethylol melamine.

27. A composition according to claim 1, which comprises an aqueous solution of amine salt of the copolymer of butyl acrylate, methyl methacrylate, N-methylol acrylamide, and acrylic acid, and the aqueous dispersion of pigment prepared by dispersing copper phthalocyanine blue in water containing polyoxyethylene nonylphenyl ether.

28. A composition according to claim 1, which comprises an aqueous solution of amine salt of the copolymer of butyl acrylate, methyl methacrylate, N-methylol acrylamide, and acrylic acid, and the aqueous dispersion of pigment prepared by dispersing tetrachloro-copper phthalocyanine blue in water containing polyoxy-ethylene nonylphenyl ether.

29. A composition according to claim 1, which comprises an aqueous solution of amine salt of the copolymer of butyl acrylate, methyl methacrylate, N-methylol acrylamide, and acrylic acid, and the aqueous dispersion of pigment prepared by dispersing copper phthalocyanine green in water containing polyoxyethylene nonylphenyl ether.

30. A composition according to claim 1, which comprises an aqueous solution of amine salt of the copolymer of butyl acrylate, methyl methacrylate, N-methylol acrylamide, and acrylic acid, the aqueous dispersion of pigment obtained by dispersing N,N'-bis(3',5'-dimethylphenyl) perylene-3,4,9,10-dicarboimide and hexamethoxymethylol melamine.

31. A composition according to claim 1, which comprises an aqueous solution of amine salt of the copolymer of butyl acrylate, methyl methacrylate, N-methylol acrylamide, and acrylic acid, the aqueous dispersion of pigment prepared by dispersing bis[2''-(methoxycarbonyl)-phenylazo-2'-hydroxy-3'-naphthoic acid]-benzidide in water containing polyoxyethylene nonylphenyl ether and hexamethoxymethylol melamine.

32. A composition according to claim 1, which comprises an aqueous solution of amine salt of the copolymer of butyl acrylate, methyl methacrylate, N-methylol acrylamide, and acrylic acid, and the aqueous dispersion of pigment prepared by dispersing 2,9-dimethylquinacridone in water containing polyoxyethylene nonylphenyl ether and hexamethoxymethylol melamine.

33. A composition according to claim 1, which comprises an aqueous solution of amine salt of the copolymer of isobutyl acrylate, methyl methacrylate, 2-hydroxyethyl methacrylate, and acrylic acid, and the aqueous dispersion of pigment prepared by dispersing bis[4'-(2''-methyl-5''-chlorophenyl-azo-acetoacetamide)-3'-chlorobenzoyl]-2,5-dimethylphenylene-1,4-diamide in water containing polyoxy-ethylene nonylphenyl ether, and pentamethoxy-monobutoxy-methylol melamine.

34. A composition according to claim 1, which comprises an aqueous solution of amine salt of the copolymer of isobutyl acrylate, methyl methacrylate, 2-hydroxyethyl methacrylate, and acrylic acid, and the aqueous dispersion of pigment prepared by dispersing Flavanthrone Yellow in water containing polyoxyethylene nonylphenyl ether, and pentamethoxy-monobutoxymethylol melamine.

35. A composition according to claim 1, which comprises an aqueous solution of amine salt of the copolymer of isobutyl acrylate, methyl methacrylate, 2-hydroxyethyl methacrylate, and acrylic acid, and the aqueous dispersion of pigment prepared by dispersing 3,3'-dichlorodiphenyl-4,4'-bisazo [acetoaceto(2,54-chloro)anilide] in water containing polyoxyethylene nonylphenyl ether, and pentamethoxy-monobutoxymethylol melamine.

36. A composition according to claim 1, which comprises an aqueous solution of amine salt of a copolymer of butyl acrylate, methyl methacrylate, N-methylol acrylamide, and acrylic acid, an aqueous dispersion of pigment prepared by dispersing N,N'-bis(3',5'-dimethyl-phenyl)perylene-3,4,9,10-dicarboimide in water containing polyoxyethylene nonylphenyl ether, and an aqueous dispersion of pigment prepared by dispersing carbon black in water containing polyoxyethylene nonylphenyl ether, and hexamethoxymethylol melamine.

37. A composition according to claim 1, which comprises an aqueous solution of amine salt of the copolymer of butyl acrylate, methyl methacrylate, N-methylol acrylamide, and acrylic acid; an aqueous dispersion of pigment prepared by dispersing copper phthalocyanine blue in water containing polyoxyethylene nonylphenyl ether; an aqueous dispersion of pigment prepared by dispersing N,N'-bis(3',5'-dimethylphenyl)-perylene-3,4,9,10-dicarboimide in water containing polyoxy-ethylene nonylphenyl ether; and an aqueous dispersion of pigment prepared by dispersing carbon black in water containing polyoxyethylene nonylphenyl ether.

38. A composition according to claim 1, which comprises an aqueous solution of amine salt of the copolymer of butyl acrylate, methyl methacrylate, N-methylol acrylamide, and acrylic acid, and an aqueous dispersion of pigment prepared by dispersing chrome yellow in water containing a condensation product of sodium naphthalenesulfonate and formalin, and hexamethoxymethylol melamine.

39. A composition according to claim 1, which comprises an aqueous solution of amine salt of the chromogen-bonded polymer prepared by reacting copper phthalocyanine blue tridiazonium chloride with ethyl acrylate, maleic anhydride, acrylic acid and acrylamide; an aqueous dispersion of pigment prepared by dispersing copper phthalocyanine blue in water containing polyoxyethylene nonylphenyl ether and an aqueous solution of amine salt of the copolymer of butyl acrylate, methyl methacrylate, N-methylolacrylamide and acrylic acid.

40. A composition according to claim 1, which comprises the aqueous solution of amine salt of the chromogen-bonded polymer prepared by reacting copper phthalocyanine blue tri-diazonium chloride with ethylacrylate, maleic anhydride, acrylic acid and acrylamide; an aqueous dispersion of pigment prepared by dispersing tetrachloro copper phthalocyanine in water containing polyoxyethylene nonylphenyl ether; and the aqueous solution of amine salt of the copolymer of butyl acrylate, methylmethacrylate, N-methylolacrylamide and acrylic acid.

41. A composition according to claim 1, which comprises the aqueous solution of amine salt of the chromogen-bonded polymer prepared by reacting copper phthalocyanine blue tridiazonium chloride with ethyl acrylate, maleic anhydride, acrylic acid and acrylamide; an aqueous dispersion of pigment prepared by dispersing copper phthalocyanine green in water containing polyoxyethylene nonylphenyl ether; and the aqueous solution of amine salt of the copolymer of butylacrylate, methylmethacrylate, N-methylol acrylamide and acrylic acid.

42. A composition according to claim 1, which comprises the aqueous solution of amine salt of the chromogen-bonded polymer prepared by reacting 2,4,6-tris{4'-[p-(diazonium chloride)benzoyl amino]-anthraquinonylamino(-1')}-s-triazine with maleic anhydride and ethyl acrylate; an aqueous dispersion of pigment prepared by dispersing N,N'-bis(3',5'-dimethyl phenyl) perylene-3,4,9,10-dicarboimide in water containing polyoxyethylene nonylphenyl ether; the aqueous solution of amine salt of the copolymer of isobutyl acrylate, styrene, 2-hydroxyethyl methacrylate and acrylic acid; and pentamethoxy-monobutoxy methylol-melamine.

43. A composition according to claim 1, which comprises the aqueous solution of amine salt of the chromogen-bonded polymer prepared by reacting 2,4,6-tris{4'-[p-(diazonium chloride)benzoylamino]anthraquinonylamino (-1')}-s-triazine with maleic anhydride and ethyl acrylate; an aqueous dispersion of pigment prepared by dispersing bis[2"-(methoxycarbonyl)phenyl-azo-2'-hydroxy-3'-naphthoic acid]-benzidide in water containing polyoxyethylene nonylphenyl ether; the aqueous solution of amine salt of the copolymer of isobutyl acrylate, styrene, 2-hydroxyethyl methacrylate and acrylic acid; and pentamethoxy-monobutoxymethylol melamine.

44. A composition according to claim 1, which comprises the aqueous solution of amine salt of the chromogen-bonded polymer prepared by reacting 2,4,6-tris{4'-[p-(diazonium chloride) benzoyl amino]anthraquinonyl (-1')}-s-triazine with maleic anhydride and ethyl acrylate; an aqueous dispersion of pigment prepared by dispersing 2,9-dimethyl quinacridone in water containing polyoxyethylene nonyl phenyl ether; the aqueous solution of amine salt of the copolymer of isobutylacrylate, styrene, 2-hydroxyethyl methacrylate and acrylic acid; and pentamethoxy-monobutoxy-methylol melamine.

45. A composition according to claim 1, which comprises the aqueous solution of amine salt of the chromogen-bonded polymer prepared by reacting 2,4,6-tris-[4'-(diazonium dodecyl benzene sulfonate) anthraquinonylamino (-1')]-s-triazine with ethylacrylate, acrylic acid and maleic anhydride; an aqueous dispersion of pigment prepared by dispersing bis-[4'-(2"-methyl-5"-chloro-phenyl-azo-acetoacetamido)-3'-chlorobenzoyl]-2,5-dimethylphenylene-1,4-diamide in water containing polyoxyethylene nonyl phenyl ether; and the aqueous solution of amine salt of the copolymer of butyl acrylate, methyl methacrylate, N-methylol-acrylamide and acrylic acid.

46. A composition according to claim 1, which comprises the aqueous solution of amine salt of the chromogen-bonded polymer prepared by reacting 2,4,6-tris-[4'-(diazonium dodecyl benzene sulfonate) anthraquinonylamino (-1')]-s-triazine with ethyl acrylate, acrylic acid and maleic anhydride; an aqueous dispersion of pigment prepared by dispersing Flavanthrone Yellow in water containing polyoxyethylene nonyl phenyl ether; and the aqueous solution of amine salt of the copolymer of butyl acrylate, methyl methacrylate, N-methylol acrylamide and acrylic acid.

47. A composition according to claim 1, which comprises the aqueous solution of amine salt of the chromogen-bonded polymer prepared by reacting 2,4,6-tris[4'-(diazonium dodecyl benzene sulfonate) anthraquinonyl amino (-1')]-s-triazine with ethyl acrylate, acrylic acid and maleic anhydride; an aqueous dispersion of pigment prepared by dispersing 3,3'-dichlorodiphenyl-4,4'-bis-[acetoaceto-(2,5-dimethoxy-4-chloro) anilide] in water containing polyoxyethylene nonyl phenyl ether; and the aqueous solution of amine salt of the copolymer of butyl acrylate, methyl methacrylate, N-methylolacrylamide and acrylic acid.

48. A composition according to claim 1, which comprises the aqueous dispersion of pigment prepared by dispersing chrome yellow in water with a condensation product of sodium naphthalene sulfonate and formalin; and an aqueous solution of ammonium salt of the copolymer obtained by copolymerizing ethyl acrylate, acrylonitrile, 2-hydroxypropyl acrylate, acrylic acid and methacrylic acid in the presence of tri-(methylated methylol) melamine and the aqueous solution of amine salt of the chromogen-bonded polymer which is prepared by reacting 2,4,6-tris[4'-(diazonium dodecyl benzene sulfonate)-anthraquinonylamino (-1')]-s-triazine with ethylacrylate, acrylic acid and maleic anhydride.

* * * * *

UNITED STATES PATENT OFFICE
CERTIFICATE OF CORRECTION

Patent No. 3,671,476                  Dated     June 20, 1972

Inventor(s)     Shiro TERAI et al

It is certified that error appears in the above-identified patent and that said Letters Patent are hereby corrected as shown below:

Column 5, line 63, "arlylamides" should read --arylamides--

Column 5, line 64, "acetoacetoarlylamides" should read --acetoacetoarylamides--

Column 25, line 61 (claim 8, line 4) "acetoacetoacrylamides" --acetoacetoarylamides--

Signed and sealed this 23rd day of January 1973.

(SEAL)
Attest:

EDWARD M. FLETCHER, JR.           ROBERT GOTTSCHALK
Attesting Officer                  Commissioner of Patents